United States Patent
Shoji et al.

(10) Patent No.: US 12,287,161 B2
(45) Date of Patent: Apr. 29, 2025

(54) ALUMINUM ALLOY HEAT EXCHANGER

(71) Applicants: UACJ Corporation, Tokyo (JP); DENSO CORPORATION, Kariya (JP)

(72) Inventors: Tomohiro Shoji, Tokyo (JP); Yoshihiko Kyo, Tokyo (JP); Atsushi Fukumoto, Tokyo (JP); Yoshiyuki Oya, Tokyo (JP); Takahiro Shinoda, Kariya (JP); Koichi Nakashita, Kariya (JP); Naoto Goto, Kariya (JP)

(73) Assignees: UACJ CORPORATION, Tokyo (JP); DENSO CORPORATION, Kariya (JP)

( * ) Notice: Subject to any disclaimer, the term of this patent is extended or adjusted under 35 U.S.C. 154(b) by 611 days.

(21) Appl. No.: 17/056,645

(22) PCT Filed: May 17, 2019

(86) PCT No.: PCT/JP2019/019759
§ 371 (c)(1),
(2) Date: Nov. 18, 2020

(87) PCT Pub. No.: WO2019/225511
PCT Pub. Date: Nov. 28, 2019

(65) Prior Publication Data
US 2021/0199395 A1      Jul. 1, 2021

(30) Foreign Application Priority Data
May 21, 2018  (JP) .................................. 2018-097300

(51) Int. Cl.
*F28F 21/08*     (2006.01)
*F28D 1/053*     (2006.01)
(Continued)

(52) U.S. Cl.
CPC .......... *F28F 21/089* (2013.01); *F28D 1/0535* (2013.01); *F28F 1/022* (2013.01);
(Continued)

(58) Field of Classification Search
CPC ........ F28F 21/089; F28F 21/084; F28F 1/022; F28F 1/126; F28F 2215/00; F28F 2275/04; F28D 1/0535
See application file for complete search history.

(56) References Cited

U.S. PATENT DOCUMENTS

2016/0167177 A1* 6/2016 Kamiya .................. C22C 21/00
148/502

FOREIGN PATENT DOCUMENTS

| CN | 104822855 A | | 8/2015 | |
| EP | 2489750 A1 | * | 8/2012 | ............ B22D 11/003 |
| EP | 3321384 A1 | * | 5/2018 | ......... B23K 35/0238 |
| EP | 3437789 A1 | * | 2/2019 | ........... B23K 35/286 |

(Continued)

OTHER PUBLICATIONS

UACJ, Heat Exchangers, Aluminum Brazing Sheets, Overview of Brazing Material, Noncorrosive flux brazing method, https://www.uacj.co.jp/english/products/sheeting/brazing-sheet.htm, Last visited Dec. 5, 2024.*

(Continued)

*Primary Examiner* — Devon Russell
(74) *Attorney, Agent, or Firm* — WHDA, LLP

(57) ABSTRACT

An aluminum alloy heat exchanger includes a core material formed of an aluminum alloy comprising Mn of 0.60 to 2.00 mass % and Cu of 1.00 mass % or less, with the balance being Al and inevitable impurities, and a sacrificial anode material formed of an aluminum alloy comprising Zn of 2.50 to 10.00 mass %, with the balance being Al and inevitable impurities. Pitting potential of a sacrificial anode material surface of a tube of the aluminum alloy heat exchanger in a 5% NaCl solution is −800 (mV vs Ag/AgCl) or less, and pitting potential of an aluminum fin of the aluminum alloy heat exchanger in a 5% NaCl solution is less than the pitting (Continued)

potential of the sacrificial anode material surface of the tube of the aluminum alloy heat exchanger in a 5% NaCl solution.

2 Claims, 3 Drawing Sheets

(51) Int. Cl.
*F28F 1/02* (2006.01)
*F28F 1/12* (2006.01)

(52) U.S. Cl.
CPC ............ *F28F 1/126* (2013.01); *F28F 21/084* (2013.01); *F28F 2215/00* (2013.01); *F28F 2275/04* (2013.01)

(56) References Cited

FOREIGN PATENT DOCUMENTS

| | | |
|---|---|---|
| JP | 2005-16937 A | 1/2005 |
| JP | 2007-247021 A | 9/2007 |
| JP | 2008-240084 A | 10/2008 |
| JP | 2009-127121 A | 6/2009 |
| JP | 2011-224656 A | 11/2011 |
| JP | 2014-114506 A | 6/2014 |
| WO | WO-2015104761 A1 * | 7/2015 ............... B21B 1/22 |

OTHER PUBLICATIONS

Office Action dated Jul. 30, 2021, issued in counterpart CN Application No. 201980028753.4, with English translation. (22 pages).
International Search Report dated Aug. 13, 2019, issued in counterpart International Application No. PCT/JP2019/019759. (1 page).
Office Action dated Nov. 6, 2024, issued in counterpart DE Application No. 112019001826.4 , with English translation. (6 pages).

* cited by examiner

ALUMINUM ALLOY HEAT EXCHANGER

TECHNICAL FIELD

The present invention relates to an aluminum alloy heat exchanger having excellent outer surface corrosion resistance in an environment in which the atmosphere side is in a dilute chloride ion environment.

BACKGROUND ART

In the art, aluminum alloy extruded tubes or tubes formed by bending an aluminum alloy plate material are applied as coolant passage tubes for aluminum alloy heat exchangers that are joined and united by brazing. To improve corrosion resistance of the outer surface (atmosphere side) of these coolant passage tubes, extruded flat perforated tubes are designed to be formed by performing Zn thermal spraying on the side serving as an outer surface of the coolant passage tubes and diffusing the thermal-sprayed Zn from the surface of the coolant passage tubes by brazing heating to form a Zn diffusion layer. Tubes serving as coolant passage tubes formed by subjecting an end portion formed by bending a clad plate material to brazing joint are designed to achieve the sacrificial anode effect with a Zn diffusion layer by cladding an Al—Zn based alloy (sacrificial anode material).

In recent years, in particular, heat exchangers for automobiles are required to reduce thickness of the constituent material and have stable high corrosion resistance in a dilute chloride ion environment, such as condensed water and rain water, as well as a concentrated chloride ion environment included in ordinary sea salt particles and/or a snow melting agent. Because CASS test using a 5% NaCl aqueous solution, SWAAT test using artificial seawater, and the like have been performed as a conventional test for evaluating corrosion resistance of heat exchangers for automobiles, aluminum materials having good corrosion resistance in those environments, that is, high-concentration chloride ion environments have been developed. However, in dilute chloride ion environments, such as concentrated water and rainwater, corrosion mechanism is different from that in high-concentration chloride ion environments. For this reason, it has been clarified that corrosion resistance of aluminum materials having good corrosion resistance in a high-concentration chloride ion environment is insufficient in an environment in which the atmosphere side is in a dilute chloride ion environment.

In addition, in conventional extruded pipes, uniform Zn thermal spraying is difficult, corrosion speed is high in a portion in which Zn is thickly thermal-sprayed, and the thickness of the sacrificial anode layer after brazing is insufficient in a portion in which Zn is thinly thermal-sprayed. In tubes formed by bending a plate material, when the Zn quantity of the sacrificial anode material is reduced to reduce the corrosion speed, a difference in potential sufficient to acquire the sacrificial anode effect cannot be secured. It is therefore difficult to reduce the Zn content of the sacrificial anode material. In addition, with respect to increase in thickness of the sacrificial anode material, it is difficult to increase the clad ratio from the viewpoint of the manufacturing cost.

For this reason, some brazing sheets have been proposed. In a proposed brazing sheet, Cu of more quantity than that of the core material is added to the brazing material on the inner surface side to provide potential gradient such that the potential becomes nobler from the outer surface side toward the inner surface side after brazing. In another proposed brazing sheet, Zn is added to the brazing material on the outer surface side, and Cu is added to the brazing material on the inner surface side such that the potential becomes nobler from the outer surface toward the inner surface of the brazing sheet by concentration gradient of Zn and Cu formed by setting Zn and Cu to a specific addition ratio.

In addition, a clad material has been proposed. In the clad material, the potential is set to become nobler from the outer surface toward the inner surface side in an aluminum alloy formed of three layers in which an inner cladding material is cladded onto a side surface opposite to the sacrificial anode material.

In addition, an aluminum alloy clad material has been proposed. In the aluminum alloy clad material, the Si content of the inner surface layer serving as the heat exchanger inner side contacting the coolant is set to 1.5% or less, to prevent the inner surface layer from being molten in brazing.

CONVENTIONAL ART LITERATURES

Patent Literatures

Patent Literature 1: Japanese Patent Publication 2011-224656-A
Patent Literature 2: Japanese Patent Publication 2009-127121-A
Patent Literature 3: Japanese Patent Publication 2007-247021-A
Patent Literature 4: Japanese Patent Publication 2008-240084-A
Patent Literature 5: Japanese Patent Publication 2014-114506-A

SUMMARY OF INVENTION

Problem to be Solved

However, in the conventional methods described above, the layer formed with Cu diffused from the brazing material and having noble potential is thin, and the difference in potential between the layer with noble potential and the core material is small. For this reason, most of the core material is worn by corrosion, and the effect of suppressing occurrence of a perforate hole is not sufficient in the state just before a perforate hole is generated.

In addition, in the conventional method described above, the effect of suppressing occurrence of a perforate hole in an environment in which the atmosphere side is in a dilute chloride ion environment is not sufficient, only by the difference in potential between the sacrificial anode material and the core material, and the difference in potential between the core material and the inner cladding material. Because the conductivity of the water film is high in a high-concentration ion environment, when the structure is placed in a corrosion environment, the sacrificial anode effect covers a sufficiently distant region, and the corrosion resistant effect is exhibited as long as a difference in potential between the sacrificial anode material and the core material serving as the member to be prevented from corrosion is secured to a certain degree. However, because the conductivity of the water film is low in a dilute chloride ion environment, when the structure is placed in a corrosion environment, the sacrificial anode effect covers only a very close region, and the corrosion resistant effect is not exhibited even when a difference in potential between the sacrificial anode material and the core material serving as the member to be prevented from corrosion is secured to a certain degree.

In addition, in the conventional method described above, the core material has a high Cu content. This structure causes the problem that Cu is diffused into the outer surface layer in brazing heating and the sacrificial anode effect of the outer surface layer decreases, and the problem that wear of the outer surface layer is accelerated because the potential of the core material is too noble with respect to the outer surface layer.

For this reason, an object of the present invention is to provide an aluminum alloy heat exchanger excellent in corrosion resistance of the outer surface in an environment in which the atmosphere side of the heat exchanger is in a dilute chloride ion environment.

Solution to Problem

To solve the problem described above, the inventors have conducted earnest investigations on an aluminum heat exchanger formed by brazing a tube formed of an aluminum alloy clad material with an aluminum fin, with respect to the relation of the structure of the aluminum alloy clad material forming the tube, the chemical composition of each of the layers of the clad material, and a combination of the tube and the aluminum fin with the corrosion resistance. As a result, the inventors have found that the sacrificial anode effect is stably exhibited even when corrosion occurs only in the surface of the sacrificial anode material of the tube, by setting the pitting potential of the sacrificial anode material surface of the tube of the aluminum alloy heat exchanger in 5% NaCl to −800 (mV vs Ag/AgCl) or less, that, by setting the pitting potential of the aluminum fin to potential less than the pitting potential of the sacrificial anode material surface of the tube, the corrosion potential of the whole aluminum heat exchanger is maintained at potential less than the pitting potential of the sacrificial anode material surface of the tube, and that corrosion occurring in the sacrificial anode material surface of the tube is suppressed. This structure suppresses occurrence of a perforate hole in an environment in which the atmosphere side is in a dilute chloride ion environment, and improves corrosion resistance of the outer surface (atmosphere side) of the aluminum alloy heat exchanger (FIG. 4 and FIG. 5).

Specifically, the present invention (1) provides an aluminum alloy heat exchanger with an atmosphere side used in a dilute chloride ion environment of 1,000 ppm or less, the aluminum alloy heat exchanger being formed by brazing a tube and an aluminum fin, the tube being formed of a tube aluminum alloy clad two-layer material formed of a core material formed of an aluminum alloy and a sacrificial anode material cladded onto one side surface of the core material such that the core material serves as a coolant passage side and the sacrificial anode material serves as the atmosphere side, wherein
  the core material is formed of an aluminum alloy comprising Mn of 0.60 to 2.00 mass % and Cu of 1.00 mass % or less, with the balance being Al and inevitable impurities,
  the sacrificial anode material is formed of an aluminum alloy comprising Zn of 2.50 to 10.00 mass %, with the balance being Al and inevitable impurities,
  pitting potential of a sacrificial anode material surface of the tube of the aluminum alloy heat exchanger in a 5% NaCl solution is −800 (mV vs Ag/AgCl) or less, and
  pitting potential of the aluminum fin of the aluminum alloy heat exchanger in a 5% NaCl solution is less than the pitting potential of the sacrificial anode material surface of the tube of the aluminum alloy heat exchanger in a 5% NaCl solution.

The present invention (2) provides the aluminum alloy heat exchanger of (1), wherein the core material of the tube aluminum alloy clad two-layer material further comprises one or two of Si of 1.50 mass % or less and Fe of 0.70 mass % or less.

The present invention (3) provides the aluminum alloy heat exchanger of any one of (1) and (2), wherein the core material of the tube aluminum alloy clad two-layer material further comprises Ti of 0.01 to 0.30 mass %.

The present invention (4) provides the aluminum alloy heat exchanger according to any one of (1) to (3), wherein the sacrificial anode material of the tube aluminum alloy clad two-layer material further comprises one or two or more of Si of 1.50 mass % or less, Fe of 1.50 mass % or less, and Mn of 1.50 mass % or less.

The present invention (5) provides an aluminum alloy heat exchanger with an atmosphere side used in a dilute chloride ion environment of 1,000 ppm or less, the aluminum alloy heat exchanger being formed by brazing a tube and an aluminum fin, the tube being formed of a tube aluminum alloy clad three-layer material formed of a core material formed of an aluminum alloy, a sacrificial anode material cladded onto one side surface of the core material, and an inner cladding material cladded onto the other side surface of the core material such that the inner cladding material serves as a coolant passage side and the sacrificial anode material serves as the atmosphere side, wherein
  the core material is formed of an aluminum alloy comprising Mn of 0.60 to 2.00 mass % and Cu of 0.60 mass % or less, with the balance being Al and inevitable impurities,
  the sacrificial anode material is formed of an aluminum alloy comprising Zn of 2.50 to 10.00 mass %, with the balance being Al and inevitable impurities,
  the inner cladding material is formed of an aluminum alloy comprising Mn of 0.60 to 2.0 mass % and Cu of 0.20 to 1.50 mass %, with the balance being Al and inevitable impurities,
  a difference (Y−X) between a Cu content (Y) of the inner cladding material of the tube aluminum alloy clad three-layer material and a Cu content (X) of the core material of the tube aluminum alloy clad three-layer material exceeds 0.00 mass %,
  pitting potential of a sacrificial anode material surface of the tube of the aluminum alloy heat exchanger in a 5% NaCl solution is −800 (mV vs Ag/AgCl) or less, and
  pitting potential of the aluminum fin of the aluminum alloy heat exchanger in a 5% NaCl solution is less than the pitting potential of the sacrificial anode material surface of the tube of the aluminum alloy heat exchanger in a 5% NaCl solution.

The present invention (6) provides the aluminum alloy heat exchanger of (5), wherein the core material of the tube aluminum alloy clad three-layer material further comprises one or two of Si of 1.50 mass % or less and Fe of 0.70 mass % or less.

The present invention (7) provides the aluminum alloy heat exchanger of any one of (5) and (6), wherein the core material of the tube aluminum alloy clad three-layer material further comprises Ti of 0.01 to 0.30 mass %.

The present invention (8) provides the aluminum alloy heat exchanger according to any one of (5) to (7), wherein the sacrificial anode material of the tube aluminum alloy clad three-layer material further comprises one or two or more of Si of 1.50 mass % or less, Fe of 1.50 mass % or less, and Mn of 1.50 mass % or less.

The present invention (9) provides the aluminum alloy heat exchanger according to any one of (5) to (8), wherein the inner cladding material of the aluminum alloy clad three-layer material further comprises one or two of Si of 1.50 mass % or less and Fe of 0.70 mass % or less.

The present invention (10) provides the aluminum alloy heat exchanger according to any one of (5) to (9), wherein the inner cladding material of the aluminum alloy clad three-layer material further comprises Ti of 0.01 to 0.30 mass %.

The present invention provides an aluminum alloy heat exchanger having excellent corrosion resistance of the outer surface serving as the atmosphere side in an environment in which the atmosphere side of the heat exchanger is in a dilute chloride ion environment.

EMBODIMENTS

Figure 1:
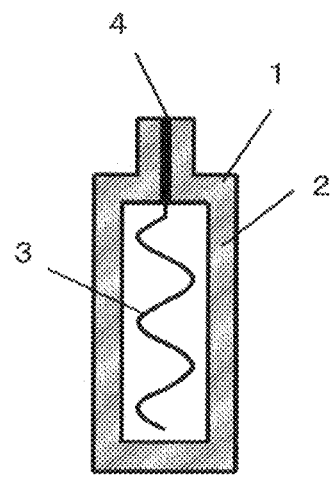
FIG. 1 is a schematic sectional view illustrating a manufacturing example of a tube of an aluminum alloy heat exchanger according to the present invention.

An aluminum alloy heat exchanger according to a first mode of the present invention is an aluminum alloy heat exchanger with an atmosphere side used in a dilute chloride ion environment of 1,000 ppm or less, the aluminum alloy heat exchanger being formed by brazing a tube and an aluminum fin, the tube being formed of a tube aluminum alloy clad two-layer material formed of a core material formed of an aluminum alloy and a sacrificial anode material cladded onto one side surface of the core material such that the core material serves as a coolant passage side and the sacrificial anode material serves as the atmosphere side, wherein
  the core material is formed of an aluminum alloy comprising Mn of 0.60 to 2.00 mass % and Cu of 1.00 mass % or less, with the balance being Al and inevitable impurities,
  the sacrificial anode material is formed of an aluminum alloy comprising Zn of 2.50 to 10.00 mass %, with the balance being Al and inevitable impurities,
  pitting potential of a sacrificial anode material surface of the tube of the aluminum alloy heat exchanger in a 5% NaCl solution is −800 (mV vs Ag/AgCl) or less, and
  pitting potential of the aluminum fin of the aluminum alloy heat exchanger in a 5% NaCl solution is less than the pitting potential of the sacrificial anode material surface of the tube of the aluminum alloy heat exchanger in a 5% NaCl solution.

The aluminum alloy heat exchanger according to the first mode of the present invention is an aluminum alloy heat exchanger with an atmosphere side used in a dilute chloride ion environment of 1,000 ppm or less. The aluminum alloy heat exchanger according to the first mode of the present invention is acquired by brazing a tube serving as a formed member of a tube aluminum alloy clad material and an aluminum fin.

In the aluminum alloy heat exchanger according to the first mode of the present invention, the tube aluminum alloy clad material to be formed in a tube shape is an aluminum alloy clad two-layer material formed of a core material formed of an aluminum alloy and a sacrificial anode material cladded onto one side surface of the core material.

The core material of the tube aluminum alloy clad two-layer material is formed of an aluminum alloy comprising Mn of 0.60 to 2.00 mass % and Cu of 1.00 mass % or less, with the balance being Al and inevitable impurities.

Mn in the core material improves strength of the core material, and sets the pitting potential of the core material noble. The Mn content of the core material of the tube aluminum alloy clad two-layer material is 0.60 to 2.00 mass %, and preferably 1.00 to 2.00 mass %. When the Mn content of the core material is less than the range described above, the effect of Mn is not sufficient. The Mn content exceeding the range described above causes difficulty in rolling of the clad material.

Cu in the core material functions to set the pitting potential of the core material to noble (high) potential, and is included to regulate the balance of the pitting potential with respect to the sacrificial anode material. Cu in the core material is diffused into the sacrificial anode material in brazing heating to reduce the difference in potential from the sacrificial anode material and increase the corrosion speed of the sacrificial anode material. For this reason, the Cu content of the core material of the tube aluminum alloy clad two-layer material is 1.00 mass % or less.

The core material of the tube aluminum alloy clad two-layer material may further comprise Si. Si in the core material functions to improve the strength of the core material. The Si content of the core material of the tube aluminum alloy clad two-layer material is 1.50 mass % or less, and preferably 0.90 mass % or less. When the Si content of the core material exceeds the range described above, the melting point of the core material decreases, and the core material becomes easily molten in brazing.

The core material of the tube aluminum alloy clad two-layer material may further comprise Fe. Fe functions to improve the strength of the core material. The Fe content of the core material of the tube aluminum alloy clad two-layer material is 0.70 mass % or less. When the Fe content of the core material exceeds the range described above, the self-corrosion speed of the core material increases.

The core material of the tube aluminum alloy clad two-layer material may further comprise Ti. Ti is divided into high-concentration regions and low-concentration regions in the thickness direction of the core material to form a layered structure in which the high-concentration regions and the low-concentration regions alternately distributed with each other, and the regions with low Ti concentration corrode with priority over the regions with high Ti concentration. As a result, Ti has the effect of making the corrosion form of the core material in a layered manner, and preventing advance of corrosion in the thickness direction of the tube to improve corrosion resistance. The Ti content of the core material of the tube aluminum alloy clad two-layer material is 0.01 to 0.30 mass %. When the Ti content of the core material is less than the range described above, the effect of Ti is not sufficient. When the Ti content exceeds the range described above, a giant crystallized substance is generated, and the formability of the tube is impaired.

The core material of the tube aluminum alloy clad two-layer material may comprise V, Cr, Zr, or B of 0.30 mass % or less, within the range not impairing the effects of the present invention.

The sacrificial anode material of the tube aluminum alloy clad two-layer material is formed of an aluminum alloy comprising Zn of 2.50 to 10.00 mass %, with the balance being Al and inevitable impurities.

Zn in the sacrificial anode material functions to set the pitting potential of the sacrificial anode material to less-noble (low) potential, and is included to regulate the balance of the pitting potential with respect to the core material and maintain the surface pitting potential of the sacrificial anode material after brazing heating at low potential. The Zn content of the sacrificial anode material of the tube aluminum alloy clad two-layer material is 2.50 to 10.00 mass %, preferably 3.50 to 1.00 mass %, and more preferably 4.50 to 10.00 mass %. When the Zn content of the sacrificial anode material is less than the range described above, the pitting potential of the sacrificial anode material surface in a 5% NaCl solution does not become −800 (mV vs Ag/AgCl) or less. When the Zn content exceeds the range described above, the pitting potential of the sacrificial anode material surface in a 5% NaCl solution becomes extremely less-noble, the self-corrosion speed of the sacrificial anode material increases, and the corrosion resistance life is shortened.

The sacrificial anode material of the tube aluminum alloy clad two-layer material may further comprise Si. Si functions to improve the strength of the sacrificial anode material. The Si content of the sacrificial anode material of the tube aluminum alloy clad two-layer material is 1.50 mass % or less, and preferably 0.50 mass % or less. When the Si content of the sacrificial anode material exceeds the range described above, the self-corrosion speed of the sacrificial anode material increases.

The sacrificial anode material of the tube aluminum alloy clad two-layer material may further comprise Fe. Fe functions to improve the strength of the sacrificial anode material. The Fe content of the sacrificial anode material of the tube aluminum alloy clad two-layer material is 1.50 mass % or less. When the Fe content of the sacrificial anode material exceeds the range described above, the self-corrosion speed of the sacrificial anode material increases.

The sacrificial anode material of the tube aluminum alloy clad two-layer material may further comprise Mn. Mn functions to improve the strength of the sacrificial anode material. The Mn content of the sacrificial anode material of the tube aluminum alloy clad two-layer material is 1.50 mass % or less, and preferably 0.50 mass % or less. When the Mn content of the sacrificial anode material exceeds the range described above, the self-corrosion speed of the sacrificial anode material increases, and the surface pitting potential of the sacrificial anode material becomes noble.

The sacrificial anode material of the tube aluminum alloy clad two-layer material may comprise In, Sn, Ti, V, Cr, Zr, or B of 0.30 mass % or less, within the range not impairing the effects of the present invention.

In the tube aluminum alloy clad two-layer material, with respect to the Si content and the Fe content of each of the sacrificial anode material and the core material, using high-purity metal causes increase in the manufacturing cost, and it is not preferable to set each of the Si content and the Fe content less than 0.03%.

In the tube aluminum alloy clad two-layer material, when the thickness thereof is 0.5 mm or less, the clad ratio of the sacrificial anode material is preferably 5 to 30%, and more preferably 10 to 30%. When the clad ratio of the sacrificial anode material is less than the range described above, the Zn quantity in the sacrificial anode material decreases due to diffusion in brazing, the pitting potential of the surface of the sacrificial anode material increases, and acquisition of a sufficient sacrificial anode effect becomes difficult. In addition, when the clad ratio of the sacrificial anode material exceeds the range described above, rolling of the clad material becomes difficult. Besides, in the tube aluminum alloy clad two-layer material, when the thickness thereof exceeds 0.5 mm, the clad ratio of the sacrificial anode material is preferably 3 to 30%.

The aluminum fin of the aluminum alloy heat exchanger according to the first mode of the present invention is formed of aluminum, and is a formed member of plate-shaped aluminum. A structure obtained by processing plate-shaped aluminum in a corrugated manner and formed in a fin shape is used as the aluminum fin. The material of the aluminum fin is pure aluminum or aluminum alloy. An example of the aluminum n material is a brazing sheet formed of a bare material, a core material formed of aluminum or aluminum alloy, and brazing materials cladded onto both side surfaces of the core material. The element included in the aluminum fin is properly selected such that the pitting potential of the aluminum fin of the aluminum alloy heat exchanger in a 5% NaCl solution is less than the pitting potential of the sacrificial anode material surface of the tube of the aluminum alloy heat exchanger in a 5% NaCl solution. For example, including much Zn in the aluminum alloy forming the aluminum fin enables the pitting potential of the aluminum fin in a 5% NaCl solution to be set less-noble. The Zn content of the aluminum alloy forming the aluminum fin is preferably 10 mass % or less. Including much Cu or Mn in the aluminum alloy forming the aluminum fin enables the pitting potential of the aluminum fin in a 5% NaCl solution to be set noble. The Cu content of the aluminum alloy forming the aluminum fin is preferably 1.00 mass % or less, and the Mn content is preferably 2.00 mass % or less. When the pitting potential of the aluminum fin in a 5% NaCl solution is less than the pitting potential of the sacrificial anode material surface of the tube in a 5% NaCl solution, the aluminum alloy forming the aluminum fin may further comprise any one or two or more of Si of 2.0 mass % or less, Fe of 2.0 mass % or less, Mg of 0.50 mass % or less, Cr of 0.30 mass % or less, Ti of 0.30 mass % or less, and Zr of 0.30 mass % or less.

The aluminum alloy heat exchanger according to the first mode of the present invention is a heat exchanger acquired by forming the tube aluminum alloy clad two-layer material in a tube shape such that the core material serves as the coolant passage side and the sacrificial anode material serves as the atmosphere side (outer surface side), and mounting and brazing-joining the aluminum fin on the outer surface side (atmosphere side) of the tube, or on the outer surface side and the inner surface side (coolant channel side).

Figure 2:
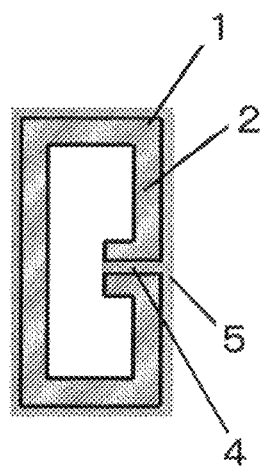
FIG. 2 is a schematic sectional view illustrating a manufacturing example of the tube of the aluminum alloy heat exchanger according to the present invention.

Examples of the method for manufacturing a tube member 1 includes a method of forming the aluminum alloy clad two-layer material 2 in a tube shape, thereafter inserting an inner fin 3 formed of a brazing sheet in which brazing materials are arranged on both side surfaces, and brazing-joining a joint 4 of the tube 1 with the brazing material of the inner fin 3, as illustrated in FIG. 1, and a method of applying paste brazing filler metal 5 in advance to the sacrificial anode material side of the aluminum alloy clad two-layer material 2, forming the aluminum alloy clad two-layer material 2 in a tube shape, or applying the paste brazing filler metal 5 after forming the aluminum alloy clad two-layer material 2 in a tube shape, and brazing-joining the joint 4 with the paste brazing filler metal 5, as illustrated in FIG. 2.

Figure 3:
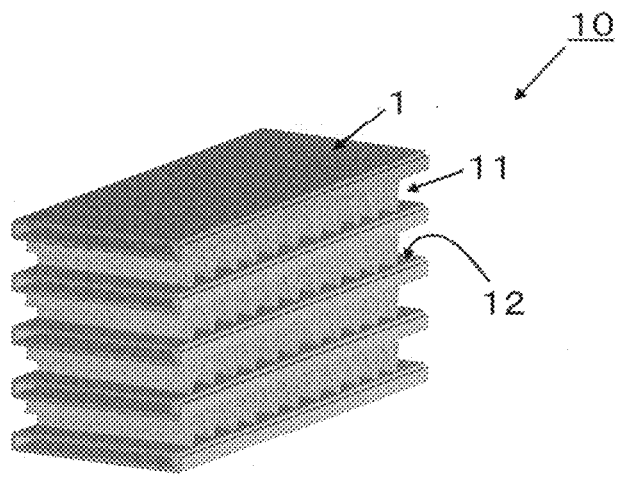
FIG. 3 is a schematic perspective view illustrating part of a mode example of the aluminum alloy heat exchanger according to the present invention.

The aluminum alloy heat exchanger according to the first mode of the present invention is manufactured by forming the tube aluminum alloy clad two-layer material in a tube shape such that the core material serves as the coolant passage side and the sacrificial anode material serves as the atmosphere side (outer surface side), and mounting the aluminum fin on the atmosphere side of the tube, applying, for example, fluoride-based flux thereto, thereafter subjecting the structure to brazing heating for three minutes at a temperature of 600° C. in an inert gas atmosphere furnace, and joining the tube with the aluminum fin. For example, in FIG. 3, an aluminum alloy heat exchanger 10 is manufactured by alternately stacking and assembling the tubes 1 acquired by forming the tube aluminum alloy clad two-layer material according to the present invention in a tube shape such that a sacrificial anode material surface 12 serves as the outer surface side (atmosphere side) and aluminum fins 11. When each of the aluminum fins is a brazing sheet, aluminum fins formed in a fin shape are used without any processing, and the aluminum fins and the tubes are subjected to brazing joint. When each of the aluminum fins is bare material, paste brazing filler metal is applied to the surface on the sacrificial anode material side of the tube to be brazing-joined with the aluminum fin, and the aluminum fin formed in a fin shape is brazing-joined with the tube. FIG. 3 is a schematic perspective view illustrating part of a mode example of the aluminum alloy heat exchanger according to the present invention.

In addition, in the aluminum alloy heat exchanger according to the first mode of the present invention, the pitting potentials of the sacrificial anode material and the core material of the assembled tube member satisfy the relation "pitting potential of the sacrificial anode material<pitting potential of the core material". Because the sacrificial anode material exhibits the sacrificial anode effect for the core material, improvement in corrosion resistance of the outer surface (atmosphere side) in an ordinary corrosion environment is achieved with the sacrificial anode layer.

In addition, in the aluminum alloy heat exchanger according to the first mode of the present invention, the pitting potential of the sacrificial anode material surface of the tube and the pitting potential of the aluminum fin satisfy the relation "pitting potential of the sacrificial anode material surface of the tube≤−800 (mV vs Ag/AgCl)" and the relation "pitting potential of the sacrificial anode material surface of the tube>pitting potential of the aluminum fin". Because the aluminum alloy heat exchanger according to the first mode of the present invention satisfies the relation "pitting potential of the sacrificial anode material surface of the tube≤−800 (mV vs Ag/AgCl)" and the relation "pitting potential of the sacrificial anode material surface of the tube>pitting potential of the aluminum fin", the whole corrosion potential is maintained at potential less than the pitting potential of the sacrificial anode material surface of the tube, and corrosion occurring in the tube surface is suppressed. This structure suppresses generation of a perforate hole on the atmosphere side in a dilute chloride ion environment, and enhances corrosion resistance of the outer surface (atmosphere side) in a dilute chloride ion environment.

The aluminum heat exchanger according to the second mode of the present invention is an aluminum alloy heat exchanger with an atmosphere side used in a dilute chloride ion environment of 1,000 ppm or less, the aluminum alloy heat exchanger being formed by brazing a tube and an aluminum fin, the tube being formed of a tube aluminum alloy clad three-layer material formed of a core material formed of an aluminum alloy, a sacrificial anode material cladded onto one side surface of the core material, and an inner cladding material cladded onto the other side surface of the core material such that the inner cladding material serves as a coolant passage side and the sacrificial anode material serves as the atmosphere side, wherein the core material is formed of an aluminum alloy comprising Mn of 0.60 to 2.00 mass % and Cu of 0.60 mass % or less, with the balance being Al and inevitable impurities, the sacrificial anode material is formed of an aluminum alloy comprising Zn of 2.50 to 10.0 mass %, with the balance being Al and inevitable impurities, the inner cladding material is formed of an aluminum alloy comprising Mn of 0.60 to 2.00 mass % and Cu of 0.20 to 1.50 mass %, with the balance being Al and inevitable impurities, a difference (Y−X) between a Cu content (Y) of the inner cladding material of the tube aluminum alloy clad three-layer material and a Cu content (X) of the core material of the tube aluminum alloy clad three-layer material exceeds 0.00 mass %, pitting potential of a sacrificial anode material surface of the tube of the aluminum alloy heat exchanger in a 5% NaCl solution is −800 (mV vs Ag/AgCl) or less, and pitting potential of the aluminum fin of the aluminum alloy heat exchanger in a 5% NaCl solution is less than the pitting potential of the sacrificial anode material surface of the tube of the aluminum alloy heat exchanger in a 5% NaCl solution.

The aluminum heat exchanger according to the second mode of the present invention is an aluminum alloy heat exchanger with an atmosphere side used in a dilute chloride ion environment of 1,000 ppm or less. The aluminum alloy heat exchanger according to the second mode of the present invention is formed by brazing a tube serving as a formed member of tube aluminum alloy clad material and an aluminum fin, In the aluminum heat exchanger according to the second mode of the present invention, the tube aluminum alloy clad material formed in a tube shape is an aluminum alloy clad three-layer material formed of a core material formed of an aluminum alloy, a sacrificial anode material cladded onto one side surface of the core material, and an inner cladding material cladded onto the other side surface of the core material.

The core material of the tube aluminum alloy clad three-layer material is formed of an aluminum alloy comprising Mn of 0.60 to 2.00 mass % and Cu of 0.60 mass % or less, with the balance being Al and inevitable impurities.

Mn in the core material improves strength of the core material, and sets the pitting potential of the core material noble. The Mn content of the core material of the tube aluminum alloy clad three-layer material is 0.60 to 2.00 mass %, and preferably 1.00 to 2.00 mass %. When the Mn content of the core material is less than the range described above, the effect of Mn is not sufficient. The Mn content exceeding the range described above causes difficulty in rolling of the clad material.

Cu in the core material is included to regulate the balance of the potential between the inner cladding material and the core material. Cu in the core material is diffused into the sacrificial anode material in brazing heating to reduce the difference in potential from the sacrificial anode material and increase the corrosion speed of the sacrificial anode material. For this reason, the Cu content of the core material of the tube aluminum alloy clad three-layer material is 1.00 mass % or less, preferably 0.40 mass % or less and less than the Cu content of the inner cladding material, and more preferably less than 0.05 mass %.

The core material of the tube aluminum alloy clad three-layer material may further comprise Si. Si in the core material functions to improve the strength of the core material. The Si content of the core material of the tube aluminum alloy clad three-layer material is 1.50 mass % or less, and preferably 0.90 mass % or less. When the Si content of the core material exceeds the range described above, the melting point of the core material decreases, and the core material becomes easily molten in brazing.

The core material of the tube aluminum alloy clad three-layer material may further comprise Fe. Fe functions to improve the strength of the core material. The Fe content of the core material of the tube aluminum alloy clad three-layer material is 0.70 mass % or less. When the Fe content of the core material exceeds the range described above, the self-corrosion speed of the core material increases.

The core material of the tube aluminum alloy clad three-layer material may further comprise Ti. Ti is divided into high-concentration regions and low-concentration regions in the thickness direction of the core material of the tube to form a layered structure in which the high-concentration regions and the low-concentration regions alternately distributed with each other, and the regions with low Ti concentration corrode with priority over the regions with high Ti concentration. As a result, Ti has the effect of making the corrosion form of the core material in a layered manner, and preventing advance of corrosion of the core material in the thickness direction of the tube to improve corrosion resistance. The Ti content of the core material of the tube aluminum alloy clad three-layer material is 0.01 to 0.30 mass %. When the Ti content of the core material is less than the range described above, the effect of Ti is not sufficient. When the Ti content exceeds the range described above, a giant crystallized substance is generated, and the formability of the tube is impaired.

The core material of the tube aluminum alloy clad three-layer material may comprise V, Cr, Zr, or B of 0.30 mass % or less, within the range not impairing the effects of the present invention.

The sacrificial anode material of the tube aluminum alloy clad three-layer material is formed of an aluminum alloy comprising Zn of 2.50 to 10.00 mass %, with the balance being Al and inevitable impurities.

Zn in the sacrificial anode material functions to set the potential of the sacrificial anode material to less-noble (low) potential, and is included to regulate the balance of the pitting potential with respect to the core material and the inner cladding material and maintain the surface pitting potential of the sacrificial anode material of the tube after brazing heating at low potential. The Zn content of the sacrificial anode material of the tube aluminum alloy clad three-layer material is 2.50 to 10.00 mass %, preferably 3.50 to 10.00 mass %, and more preferably 4.50 to 10.00 mass %. When the Zn content of the sacrificial anode material is less than the range described above, the effect of Zn is not sufficient. When the Zn content exceeds the range described above, the self-corrosion speed of the sacrificial anode material increases, and the corrosion resistance life is shortened.

The sacrificial anode material of the tube aluminum alloy clad three-layer material may further comprise Si. Si functions to improve the strength of the sacrificial anode material. The Si content of the sacrificial anode material of the tube aluminum alloy clad three-layer material is 1.50 mass % or less, and preferably 0.50 mass % or less. When the Si content of the sacrificial anode material exceeds the range described above, the self-corrosion speed of the sacrificial anode material increases.

The sacrificial anode material of the tube aluminum alloy clad three-layer material may further comprise Fe. Fe functions to improve the strength of the sacrificial anode material. The Fe content of the sacrificial anode material of the tube aluminum alloy clad three-layer material is 1.50 mass % or less. When the Fe content of the sacrificial anode material exceeds the range described above, the self-corrosion speed of the sacrificial anode material increases.

The sacrificial anode material of the tube aluminum alloy clad three-layer material may further comprise Mn. Mn functions to improve the strength of the sacrificial anode material. The Mn content of the sacrificial anode material of the tube aluminum alloy clad three-layer material is 1.50 mass % or less, and preferably 0.50 mass % or less. When the Mn content of the sacrificial anode material exceeds the range described above, the self-corrosion speed of the sacrificial anode material increases, and the surface pitting potential of the sacrificial anode material becomes noble.

The sacrificial anode material of the tube aluminum alloy clad three-layer material may comprise In, Sn, Ti, V, Cr, Zr, or B of 0.30 mass % or less, within the range not impairing the effects of the present invention.

The inner cladding material of the tube aluminum alloy clad three-layer material is formed of an aluminum alloy comprising Mn of 0.60 to 2.00 mass % and Cu of 0.20 to 1.50 mass %, with the balance being Al and inevitable impurities.

Mn in the inner cladding material improves strength of the inner cladding material, and sets the pitting potential of the inner cladding material noble. The Mn content of the inner cladding material of the tube aluminum alloy clad three-layer material is 0.60 to 2.0 mass %, and preferably 1.0 to 2.0 mass %. When the Mn content of the inner cladding material is less than the range described above, the effect of Mn is not sufficient. The Mn content exceeding the range described above causes difficulty in rolling of the clad material.

Cu in the core material functions to set the potential of the inner cladding material to noble (high) potential, and is included to regulate the balance of the potential with respect to the core material. The Cu content of the inner cladding material of the tube aluminum alloy clad three-layer material is 0.20 to 1.50 mass %, and preferably 0.20 to 1.00 mass %. When the Cu content of the inner cladding material is less than the range described above, the effect of Cu is not sufficient. When the Cu content exceeds the range described above, the melting point of the inner cladding material decreases, and the inner cladding material becomes easily molten in brazing.

A difference (Y–X) between the Cu content (Y) of the inner cladding material of the tube aluminum alloy clad three-layer material and the Cu content (X) of the core material of the tube aluminum alloy clad three-layer material exceeds 0.00 mass %, preferably exceeds 0.00 mass % and is equal to or less than 0.40 mass %.

The inner cladding material of the tube aluminum alloy clad three-layer material may further comprise Si. Si functions to improve the strength of the inner cladding material. The Si content of the inner cladding material of the tube aluminum alloy clad three-layer material is 1.50 mass % or less, and preferably 0.90 mass % or less. When the Si content of the inner cladding material exceeds the range described above, the melting point of the inner cladding material decreases, and the inner cladding material becomes easily molten in brazing.

The inner cladding material of the tube aluminum alloy clad three-layer material may further comprise Fe. Fe functions to improve the strength of the inner cladding material. The Fe content of the inner cladding material of the tube aluminum alloy clad three-layer material is 0.70 mass % or less. When the Fe content of the inner cladding material exceeds 0.70 mass %, the self-corrosion speed of the inner cladding material increases.

The inner cladding material of the tube aluminum alloy clad three-layer material may further comprise Ti. Ti is divided into high-concentration regions and low-concentration regions in the thickness direction of the inner cladding material to form a layered structure in which the high-concentration regions and the low-concentration regions alternately distributed with each other, and the regions with low Ti concentration corrode with priority over the regions with high Ti concentration. As a result, Ti has the effect of making the corrosion form of the core material in a layered manner, and preventing advance of corrosion in the thickness direction of the tube to improve corrosion resistance of the tube. The Ti content of the inner cladding material of the tube aluminum alloy clad three-layer material is 0.01 to 0.30 mass %. When the Ti content of the inner cladding material exceeds the range described above, a giant crystallized substance is generated, and the formability of the tube is impaired.

The inner cladding material of the tube aluminum alloy clad three-layer material may comprise V, Cr, Zr, or B of 0.30 mass % or less, within the range not impairing the effects of the present invention.

In the tube aluminum alloy clad three-layer material, with respect to the Si content and the Fe content of each of the sacrificial anode material, the core material, and the inner cladding material, using high-purity metal causes increase in the manufacturing cost, and it is not preferable to set each of the Si content and the Fe content less than 0.03%.

In the tube aluminum alloy clad three-layer material, when the thickness thereof is 0.5 mm or less, the clad ratio of the sacrificial anode material is preferably 5 to 30%, and more preferably 10 to 30%. When the clad ratio of the sacrificial anode material is less than the range described above, the Zn quantity in the sacrificial anode material decreases due to diffusion in brazing, the pitting potential of the surface of the sacrificial anode material increases, and acquisition of a sufficient sacrificial anode effect becomes difficult. In addition, when the clad ratio of the sacrificial anode material exceeds the range described above, rolling of the clad material becomes difficult. Besides, in the tube aluminum alloy clad three-layer material, when the thickness thereof exceeds 0.5 mm, the clad ratio of the sacrificial anode material is preferably 3 to 30%.

In the tube aluminum alloy clad three-layer material, when the thickness thereof is 0.5 mm or less, the clad ratio of the inner cladding material is preferably 5 to 30%, and more preferably 10 to 30. When the clad ratio of the inner cladding material is less than the range described above, the Cu concentration in the inner cladding material is lowered due to diffusion in brazing, the difference in potential from the core material decreases, and acquisition of the sacrificial anode effect of the core material becomes difficult. In addition, when the clad ratio of the inner cladding material exceeds the range described above, rolling of the clad material becomes difficult. Besides, in the tube aluminum alloy clad three-layer material, when the thickness thereof exceeds 0.5 mm, the clad ratio of the inner cladding material is preferably 3 to 30%.

The aluminum fin of the aluminum alloy heat exchanger according to the second mode of the present invention is formed of aluminum, and is a formed member of plate-shaped aluminum. A structure obtained by processing plate-shaped aluminum in a corrugated manner and formed in a fin shape is used as the aluminum fin. The material of the aluminum fin is pure aluminum or aluminum alloy. An example of the aluminum fin material is a brazing sheet formed of a bare material, a core material formed of aluminum or aluminum alloy, and brazing materials cladded onto both side surfaces of the core material. The element included in the aluminum fin is properly selected such that the pitting potential of the aluminum fin of the aluminum alloy heat exchanger in a 5% NaCl solution is less than the pitting potential of the sacrificial anode material surface of the tube of the aluminum alloy heat exchanger in a 5% NaCl solution. For example, including much Zn in the aluminum alloy forming the aluminum fin enables the pitting potential of the aluminum fin a 5% NaCl solution to be set less-noble. The Zn content of the aluminum alloy forming the aluminum fin is preferably 10.00 mass % or less. Including much Cu or Mn in the aluminum alloy forming the aluminum fin enables the pitting potential of the aluminum fin in a 5% NaCl solution to be set noble. The Cu content of the aluminum alloy forming the aluminum fin is preferably 1.00 mass % or less, and the Mn content is preferably 2.00 mass % or less. When the pitting potential of the aluminum fin in a 5% NaCl solution is less than the pitting potential of the sacrificial anode material surface of the tube in a 5% NaCl solution, the aluminum alloy forming the aluminum fin may further comprise any one or two or more of Si of 2.0 mass % or less, Fe of 2.00 mass % or less, Mg of 0.50 mass % or less, Cr of 0.30 mass % or less, Ti of 0.30 mass % or less, and Zr of 0.30 mass % or less.

The aluminum alloy heat exchanger according to the second mode of the present invention is a heat exchanger acquired by forming the tube aluminum alloy clad three-layer material in a tube shape such that the inner cladding material serves as the coolant passage side and the sacrificial anode material serves as the atmosphere side (outer surface side), and mounting and brazing-joining the aluminum fin on the outer surface side (atmosphere side) of the tube, or on the outer surface side and the inner surface side (coolant channel side).

The method for manufacturing the tube in the aluminum alloy heat exchanger according to the second mode of the present invention is similar to the method for manufacturing the tube in the aluminum alloy heat exchanger according to the first mode of the present invention.

The aluminum alloy heat exchanger according to the second mode of the present invention is manufactured by forming the tube aluminum alloy clad three-layer material in a tube shape such that the inner cladding material serves as the coolant passage side and the sacrificial anode material serves as the atmosphere side (outer surface side), and mounting the aluminum fin on the outer surface side (atmosphere side) of the tube, for example, applying fluoride-based flux thereto, thereafter subjecting the structure to brazing heating for three minutes at a temperature of 600° C. in an inert gas atmosphere furnace, and joining the tube with the aluminum fin. The method for manufacturing the aluminum alloy heat exchanger according to the second mode of the present invention is similar to the method for manufacturing the aluminum alloy heat exchanger according to the first mode of the present invention.

In addition, in the aluminum alloy heat exchanger according to the second mode of the present invention, the pitting potentials of the sacrificial anode material, the core material, and the inner cladding material of the assembled tube member satisfy the relation "pitting potential of the sacrificial anode material<pitting potential of the core material<pitting potential of the inner cladding material". Because the sacrificial anode material exhibits the sacrificial anode effect for the core material and the core material exhibits the sacrificial anode effect for the inner cladding material, improvement in corrosion resistance of the outer surface (atmosphere side) in an ordinary corrosion environment is achieved with each of the sacrificial anode layers.

In addition, in the aluminum alloy heat exchanger according to the second mode of the present invention, the pitting potential of the sacrificial anode material surface of the tube and the pitting potential of the aluminum fin satisfy the relation "pitting potential of the sacrificial anode material surface of the tube≤−800 (mV vs Ag/AgCl)" and the relation "pitting potential of the sacrificial anode material surface of the tube>pitting potential of the aluminum fin". Because the aluminum alloy heat exchanger according to the second mode of the present invention satisfies the relation "pitting potential of the sacrificial anode material surface of the tube≤−800 (mV vs Ag/AgCl)" and the relation "pitting potential of the sacrificial anode material surface of the tube>pitting potential of the aluminum fin", the corrosion potential of the whole heat exchanger is maintained at potential less than the pitting potential of the sacrificial anode material surface of the tube, and corrosion occurring at the tube surface is suppressed. This structure suppresses generation of a perforate hole on the atmosphere side in a dilute chloride ion environment, and enhances corrosion resistance of the outer surface (atmosphere side) in a dilute chloride ion environment.

The following is an explanation of comparison of examples of the present invention with comparative examples to prove the effect thereof. These examples indicate an embodiment of the present invention, and the present invention is not limited thereto.

EXAMPLES

Example 1

Sacrificial anode material alloy, core material alloy, and inner cladding material alloy comprising compositions listed in Table 1 were casted into ingots by semi-continuous casting. In the acquired ingots, the sacrificial anode material alloy ingot was homogenized at 500° C. for eight hours, and thereafter hot-rolled at a start temperature of 500° C. to a predetermined thickness. The core material alloy ingot and the inner cladding material alloy ingot were homogenized at 500° C. for eight hours, thereafter the core material alloy ingot was faced, and the inner cladding material alloy ingot was hot-rolled at a start temperature of 500° C. to a predetermined thickness.

Thereafter, the hot-rolled members of the sacrificial anode material alloy and the inner cladding material alloy were faced, and thereafter each of the aluminum alloys were stacked in combinations listed in Table 1. Each of the stacked structures was hot-rolled at a start temperature of 500° C. to a thickness of 3 mm, thereafter cold-rolled, and subjected to intermediate annealing at a temperature of 400° C. Thereafter, the structures were cold-rolled to acquire aluminum alloy clad plate materials (Test Pieces 1 to 109) with a thickness of 0.2 mm.

Thereafter, a core material alloy ingot and a brazing material alloy ingot comprising compositions listed in Table 1 were casted by semi-continuous casting. The brazing material alloy ingot of the aluminum fin material was homogenized at 500° C. for one hour, and thereafter hot-rolled at a start temperature of 500° C. to a predetermined thickness. The core material alloy ingot of the aluminum fin material was homogenized at 500° C. for eight hours, thereafter the surfaces of the core material alloy ingot on which the brazing material alloy ingot was to be stacked were faced. Thereafter, the brazing material alloy ingots were stacked on both sides of the core material alloy ingot of the aluminum fin material. Each of the stacked structures was hot-rolled at a start temperature of 500° C. to acquire a clad material with a predetermined thickness. Thereafter, each of the clad materials was cold-rolled, and subjected to intermediate annealing at a temperature of 400° C. Thereafter, the clad materials were cold-rolled to acquire aluminum fin materials with a thickness of 0.08 mm. The composition of the brazing material alloy ingot of the aluminum fin material was set as aluminum alloy comprising Si of 10.00 mass %, with the balance being Al and inevitable impurities, and the clad ratio of the brazing material was set to 10% per one side surface.

Comparative Example 1

Sacrificial anode material alloy, core material alloy, and inner cladding material alloy comprising compositions listed in Table 2 were casted into ingots by semi-continuous casting. In the ingots, the sacrificial anode material alloy ingot was homogenized at 500° C. for eight hours, and thereafter hot-rolled at a start temperature of 500° C. to a predetermined thickness. The core material alloy ingot and the inner cladding material alloy ingot were homogenized at 500° C. for eight hours, thereafter the core material alloy ingot was faced, and the inner cladding material alloy ingot was hot-rolled at a start temperature of 500° C. to a predetermined thickness.

Thereafter, the hot-rolled members of the sacrificial anode material alloy and the inner cladding material alloy were cut into a predetermined size, and each of the aluminum alloys were stacked in combinations listed in Table 2. Each of the stacked structures was hot-rolled at a start temperature of 500° C. to a thickness of 3 mm, thereafter cold-rolled, and subjected to intermediate annealing at a temperature of 400° C. Thereafter, the structures were cold-rolled to acquire aluminum alloy clad plate materials (Test Pieces 201 to 220) with a thickness of 0.2 mm.

Thereafter, a core material alloy ingot and a brazing material alloy ingot comprising compositions listed in Table 2 were casted by semi-continuous casting. The brazing material alloy ingot of the aluminum fin material was homogenized at 500° C. for one hour, and thereafter hot-rolled at a start temperature of 500° C. to a predetermined thickness. The core material alloy ingot of the aluminum fin material was homogenized at 500° C. for eight hours, thereafter the surfaces of the core material alloy ingot on which the brazing material alloy ingot was to be stacked were faced. Thereafter, the brazing material alloy ingots were stacked on both sides of the core material alloy ingot of the aluminum fin material. Each of the stacked structures was hot-rolled at a start temperature of 500° C. to acquire a clad material with a predetermined thickness. Thereafter, each of the clad materials was cold-rolled, and subjected to intermediate annealing at a temperature of 400° C. Thereafter, the clad materials were cold-rolled to acquire aluminum fin materials with a thickness of 0.08 mm. The composition of the brazing material alloy ingot of the aluminum fin material was set as aluminum alloy comprising Si of 10.00 mass %, with the balance being Al and inevitable impurities, and the clad ratio of the brazing material was set to 10% per one side surface.

The acquired test pieces were heated for three minutes at 600° C. corresponding to brazing heating and subjected to tensile test. In addition, each of the acquired test pieces was formed into a tube with the sacrificial anode material positioned as the outer surface, aluminum fins were mounted between the formed tubes, and a tank and the like were formed and mounted to each of the structures. Thereafter, the structures were subjected to brazing heating at a temperature of 585 to 630° C. for 1 to 30 minutes, and subjected to potential measurement and corrosion test by the following methods. Tables 3 and 4 list the results of the tests.

Tensile Test

The test pieces were formed in test pieces of JIS-5, and subjected to tensile test compliant with JIS Z2241. The test pieces having tensile strength of 70 MPa or more were evaluated as the pieces that passed the test.

Potential Measurement

The pitting potential of each of the test pieces was measured in a 5% NaCl aqueous solution at room temperature. The surface potential of the sacrificial anode material was measured with the parts of the test piece masked except the sacrificial anode material side surface. The potential of the core material was measured with the parts masked except the core material surface when no inner cladding material existed in the test piece. When the inner cladding material existed in the test piece, the test piece was ground from the sacrificial anode material surface side to the center of the thickness of the core material, and measurement was performed in a state in which the parts was masked except the ground surface. The potential of the inner cladding material with the parts masked except the inner cladding material side surface.

Corrosion Test

Each of the test pieces was formed into a tube in a state in which the sacrificial anode material of the test piece is positioned as the outer surface, aluminum fins were mounted between the formed tubes, and a tank and the like were formed and mounted to each of the structures. After fluoride flux was applied to each of the structures, the structures were subjected to brazing heating at 600° C. for three minutes to acquire heat exchangers. From each of the acquired heat exchangers, only the aluminum fin and the sacrificial anode material surface joined with the aluminum fin were exposed by masking to acquire a test piece. Each of the acquired test pieces was subjected to spray test at cycles compliant with ASTM G85 to evaluate corrosion resistance. In the spray test, an aqueous solution acquired by mixing 100 ppm NaCl, 100 ppm $HCO_3$, and 100 ppm $Na_2SO_4$ with pH set to 3 was used to simulate a dilute chloride ion environment. In the test pieces, the test pieces in which no perforate hole was generated in the tube at the point when 2,500 hours passed and the corrosion depth was less than 0.10 mm were evaluated as excellent (OO) pieces, the test pieces in which no perforate hole was generated in the tube at the point when 2,500 hours passed but the corrosion depth was equal to or larger than 0.10 mm were evaluated as good (O) pieces, and the test pieces in which a perforate hole was generated before 2,500 hours passed were evaluated as inferior (x) pieces. Here, 100 ppm NaCl is an environment corresponding to the chloride ion concentration of 60 ppm.

As listed in Table 3, each of Test Pieces 1 to 109 of the examples had tensile strength of 70 MPa or more after heating corresponding to brazing. In each of heat exchanger test pieces acquired by combining and brazing the test pieces 1 to 109 with the aluminum fins, the pitting potential of the sacrificial anode material surface of the tube and the pitting potential of the aluminum fin satisfied the relation "pitting potential of the sacrificial anode material surface of the tube≤−800 (mV vs Ag/AgCl)" and the relation "pitting potential of the sacrificial anode material surface of the tube>pitting potential of the aluminum fin", and no perforate hole was generated in the corrosion test.

Figure 4:
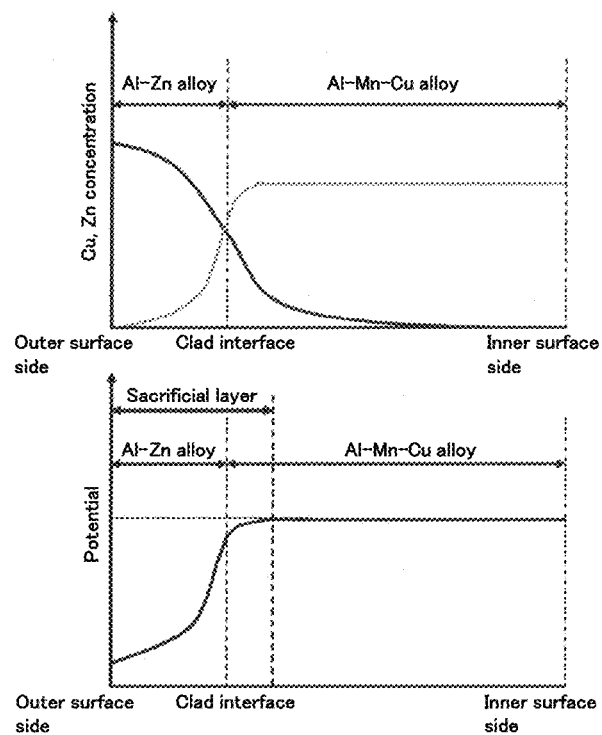
FIG. 4 is a diagram illustrating a Zn diffusion state from a sacrificial anode material of the tube after brazing, a Cu diffusion state from a core material layer, and potential distribution.
Figure 5:
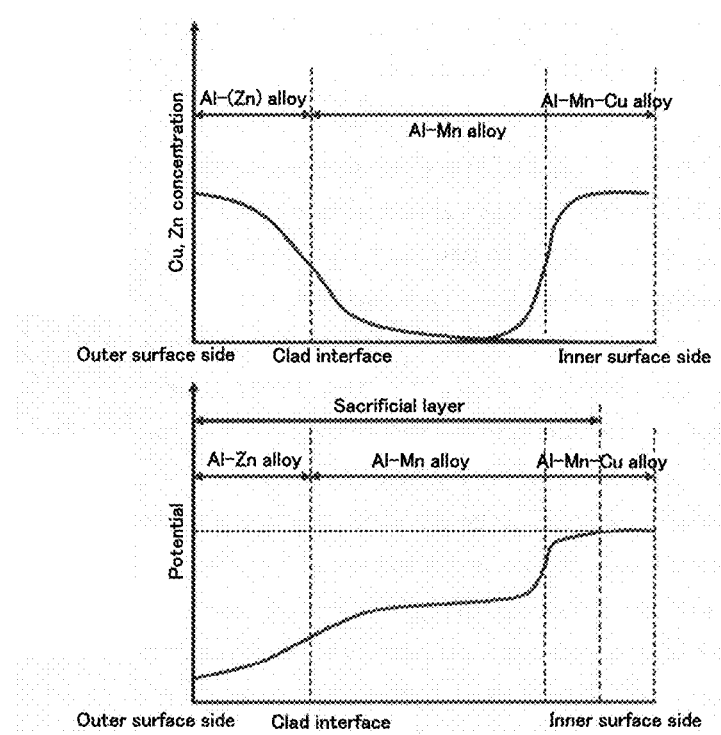
FIG. 5 is a diagram illustrating a Zn diffusion state from the sacrificial anode material of the tube after brazing, a Cu diffusion state from the core material layer and an inner cladding material layer, and potential distribution.

By contrast, as listed in FIG. 4, in Test Piece 201 of the comparative example, because the Zn concentration in the sacrificial anode material was low, the pitting potential of the sacrificial anode material surface after brazing exceeded −800 mV, and the sacrificial anode effect was not sufficiently exhibited. As a result, a perforate hole is generated in the tube in the corrosion test, in Test Piece 201. In Test Piece 202, because the Zn concentration of the sacrificial anode material was high and the pitting potential of the sacrificial anode material surface was equal to or smaller than the pitting potential of the aluminum fin, the self-corrosion speed of the aluminum fin after brazing increased, and a perforate hole was generated in the tube in the corrosion test. In Test Piece 203, because the Si concentration in the sacrificial anode material was high, the self-corrosion speed of the sacrificial anode material after brazing was high, and a perforate hole was generated in the tube in the corrosion test. In Test Piece 204, because the Fe concentration in the sacrificial anode material was high, the self-corrosion speed of the sacrificial anode material after brazing was high, and a perforate hole was generated in the tube in the corrosion test. In Test Piece 205, because the Mn concentration in the sacrificial anode material was high, the self-corrosion speed of the sacrificial anode material after brazing was high, and a perforate hole was generated in the tube in the corrosion test.

In Test Piece 206, because the Cu concentration of the core material was high, the core material of the tube was molten in brazing. In Test Piece 207, because the Mn concentration of the core material was low, the tensile strength after heating corresponding to brazing was less than 70 MPa. In Test Piece 208, because the Mn concentration of the core material was high, a crack occurred in rolling of the clad material, and no sound material was acquired. In Test Piece 209, because the Si concentration of the core material was high, the core material of the tube was molten in brazing. In Test Piece 210, because the Fe concentration of the core material was high, the self-corrosion speed of the core material increased, and a perforate hole was generated in the tube in the corrosion test.

In Test Piece 211, because the Cu concentration of the inner cladding material was lower than the Cu concentration of the core material, the core material did not function as the sacrificial anode layer of the inner cladding material (the inner cladding material functioned as the sacrificial anode layer of the core material), and a perforate hole was generated in the tube in the corrosion test. In Test Piece 212, because the Cu concentration was high, the inner cladding material was molten in brazing. In Test Piece 213, because the Mn concentration of the inner cladding material was high, a crack occurred in rolling, and no sound material was acquired. In Test Piece 214, because the Si concentration of the inner cladding material was high, the inner cladding material was molten in brazing. In Test Piece 215, because the Fe concentration of the inner cladding material was high, the self-corrosion speed of the inner cladding material increased, and a perforate hole was generated in the tube in the corrosion test.

In Test Piece 216, because the clad ratio of the sacrificial anode material was low and the pitting potential of the sacrificial anode material surface after brazing exceeded −800 (mV vs Ag/AgCl), a perforate hole was generated in the tube in the corrosion test. In Test Piece 217, because the pitting potential of the sacrificial anode material surface after brazing was less-nobler than the pitting potential of the aluminum fin, a perforate hole was generated in the tube in the corrosion test. In Test Piece 218, because the pitting potential of the sacrificial anode material surface after brazing exceeded −800 mV and was less-nobler than the pitting potential of the aluminum fin, a perforate hole was generated in the tube in the corrosion test. In Test Piece 219, because the pitting potential of the sacrificial anode material surface after brazing exceeded −800 mV and was less-nobler than the pitting potential of the aluminum fin, a perforate hole was generated in the tube in the corrosion test. In Test Piece 220, because the pitting potential of the sacrificial anode material surface after brazing was less-nobler than the pitting potential of the aluminum fin, a perforate hole was generated in the tube in the corrosion test.

TABLE 1-1

| | Sacrificial Anode Material | | | | | | Core Material | | | | |
|---|---|---|---|---|---|---|---|---|---|---|---|
| No. | Si | Fe | Mn | Zn | Others | Clad Ratio (%) | Si | Fe | Cu (X) | Mn | Others |
| 1 | 0.10 | 0.30 | 0.00 | 2.50 | | 20 | 0.70 | 0.20 | 0.15 | 1.50 | |
| 2 | 0.10 | 0.30 | 0.00 | 10.00 | | 20 | 0.70 | 0.20 | 0.15 | 1.50 | |
| 3 | 1.50 | 0.30 | 0.00 | 6.00 | | 20 | 0.70 | 0.20 | 0.15 | 1.50 | |
| 4 | 0.10 | 1.50 | 0.00 | 6.00 | | 20 | 0.70 | 0.20 | 0.15 | 1.50 | |
| 5 | 0.10 | 0.30 | 1.50 | 6.00 | | 20 | 0.70 | 0.20 | 0.15 | 1.50 | |
| 6 | 0.10 | 0.30 | 0.00 | 6.00 | Ti:0.05 B:0.05 | 20 | 0.70 | 0.20 | 0.15 | 1.50 | |
| 7 | 0.10 | 0.30 | 0.00 | 6.00 | Cr:0.05 V:0.08 Zr:0.05 | 20 | 0.70 | 0.20 | 0.15 | 1.50 | |
| 8 | 0.10 | 0.30 | 0.00 | 6.00 | Sn:0.04 In:0.02 | 20 | 0.70 | 0.20 | 0.15 | 1.50 | |
| 9 | 0.50 | 0.30 | 0.00 | 6.00 | | 20 | 0.70 | 0.20 | 0.15 | 1.50 | |
| 10 | 0.10 | 0.05 | 0.00 | 6.00 | | 20 | 0.70 | 0.20 | 0.15 | 1.50 | |
| 11 | 0.10 | 0.30 | 0.50 | 6.00 | | 20 | 0.70 | 0.20 | 0.15 | 1.50 | |
| 12 | 0.10 | 0.30 | 0.10 | 6.00 | | 20 | 0.70 | 0.20 | 0.15 | 1.50 | |
| 13 | 0.10 | 0.30 | 0.00 | 3.50 | | 20 | 0.70 | 0.20 | 0.15 | 1.50 | |
| 14 | 0.10 | 0.30 | 0.00 | 4.50 | | 20 | 0.70 | 0.20 | 0.15 | 1.50 | |
| 15 | 0.10 | 0.30 | 0.00 | 6.00 | | 20 | 0.70 | 0.20 | 0.00 | 1.50 | |
| 16 | 0.10 | 0.30 | 0.00 | 6.00 | | 20 | 0.70 | 0.20 | 1.00 | 1.50 | |
| 17 | 0.10 | 0.30 | 0.00 | 6.00 | | 20 | 0.70 | 0.20 | 0.15 | 0.60 | |
| 18 | 0.10 | 0.30 | 0.00 | 6.00 | | 20 | 0.70 | 0.20 | 0.15 | 2.00 | |
| 19 | 0.10 | 0.30 | 0.00 | 6.00 | | 20 | 1.50 | 0.20 | 0.15 | 1.50 | |
| 20 | 0.10 | 0.30 | 0.00 | 6.00 | | 20 | 0.70 | 0.20 | 0.15 | 1.50 | |
| 21 | 0.10 | 0.30 | 0.00 | 6.00 | | 20 | 0.70 | 0.20 | 0.15 | 1.50 | Ti: 0.20 |
| 22 | 0.10 | 0.30 | 0.00 | 6.00 | | 20 | 0.70 | 0.20 | 0.15 | 1.50 | Cr: 0.05 V: 0.05 B: 0.05 Zr: 0.05 |
| 23 | 0.10 | 0.30 | 0.00 | 6.00 | | 20 | 0.05 | 0.20 | 0.15 | 1.50 | |
| 24 | 0.10 | 0.30 | 0.00 | 6.00 | | 20 | 0.70 | 0.05 | 0.15 | 1.50 | |
| 25 | 0.10 | 0.30 | 0.00 | 6.00 | | 20 | 0.70 | 0.20 | 0.15 | 1.00 | |
| 26 | 0.10 | 0.30 | 0.00 | 6.00 | | 20 | 0.70 | 0.20 | 0.15 | 1.50 | |
| 27 | 0.10 | 0.30 | 0.00 | 6.00 | | 20 | 0.70 | 0.20 | 0.15 | 1.50 | |
| 28 | 0.10 | 0.30 | 0.00 | 6.00 | | 20 | 0.70 | 0.20 | 0.15 | 1.50 | |
| 29 | 0.10 | 0.30 | 0.00 | 6.00 | | 20 | 0.70 | 0.20 | 0.15 | 1.50 | |
| 30 | 0.10 | 0.30 | 0.00 | 6.00 | | 20 | 0.70 | 0.20 | 0.15 | 1.50 | |

| | Inner cladding material | | | | | | | Core Material of Fin | | | |
|---|---|---|---|---|---|---|---|---|---|---|---|
| No. | Si | Fe | Cu (Y) | Mn | Others | Clad Ratio (%) | Y-X (%) | Cu | Mn | Zn | Others |
| 1 | — | — | — | — | — | — | — | — | 1.00 | 6.00 | — |
| 2 | — | — | — | — | — | — | — | — | — | 8.50 | — |
| 3 | — | — | — | — | — | — | — | — | — | 6.00 | — |
| 4 | — | — | — | — | — | — | — | — | — | 6.50 | — |
| 5 | — | — | — | — | — | — | — | — | — | 4.00 | — |
| 6 | — | — | — | — | — | — | — | — | 0.05 | 7.50 | — |
| 7 | — | — | — | — | — | — | — | — | — | 8.00 | — |
| 8 | — | — | — | — | — | — | — | — | — | 7.50 | In: 0.002 |
| 9 | — | — | — | — | — | — | — | — | — | 6.50 | — |
| 10 | — | — | — | — | — | — | — | — | — | 7.50 | — |
| 11 | — | — | — | — | — | — | — | — | — | 4.50 | — |

TABLE 1-1-continued

| | | | | | | | | | | | |
|---|---|---|---|---|---|---|---|---|---|---|---|
| 12 | — | — | — | — | — | — | — | — | — | 7.50 | — |
| 13 | — | — | — | — | — | — | — | — | — | 4.00 | — |
| 14 | — | — | — | — | — | — | — | — | — | 4.50 | — |
| 15 | — | — | — | — | — | — | — | — | — | 7.50 | — |
| 16 | — | — | — | — | — | — | — | — | — | 6.00 | — |
| 17 | — | — | — | — | — | — | — | — | — | 7.50 | — |
| 18 | — | — | — | — | — | — | — | — | — | 7.50 | — |
| 19 | — | — | — | — | — | — | — | — | — | 7.50 | — |
| 20 | — | — | — | — | — | — | — | — | — | 7.50 | — |
| 21 | — | — | — | — | — | — | — | — | — | 7.50 | — |
| 22 | — | — | — | — | — | — | — | — | — | 7.50 | — |
| 23 | — | — | — | — | — | — | — | — | — | 7.50 | — |
| 24 | — | — | — | — | — | — | — | — | — | 7.50 | — |
| 25 | — | — | — | — | — | — | — | — | — | 7.50 | — |
| 26 | 0.70 | 0.20 | 0.20 | 1.50 | | 20 | 0.05 | — | — | 7.50 | — |
| 27 | 0.70 | 0.20 | 1.50 | 1.50 | | 20 | 1.35 | — | — | 7.50 | — |
| 28 | 0.70 | 0.20 | 0.80 | 0.60 | | 20 | 0.65 | — | — | 7.50 | — |
| 29 | 0.70 | 0.20 | 0.80 | 2.00 | | 20 | 0.65 | — | — | 7.50 | — |
| 30 | 1.50 | 0.20 | 0.80 | 1.50 | | 20 | 0.65 | — | — | 7.50 | — |

TABLE 1-2

| | Sacrificial Anode Material | | | | | | Core Material | | | | |
|---|---|---|---|---|---|---|---|---|---|---|---|
| No. | Si | Fe | Mn | Zn | Others | Clad Ratio (%) | Si | Fe | Cu (X) | Mn | Others |
| 31 | 0.10 | 0.30 | 0.00 | 6.00 | | 20 | 0.70 | 0.20 | 0.15 | 1.50 | |
| 32 | 0.10 | 0.30 | 0.00 | 6.00 | | 20 | 0.70 | 0.20 | 0.15 | 1.50 | |
| 33 | 0.10 | 0.30 | 0.00 | 6.00 | | 20 | 0.70 | 0.20 | 0.15 | 1.50 | |
| 34 | 0.10 | 0.30 | 0.00 | 6.00 | | 20 | 0.70 | 0.20 | 0.00 | 1.50 | |
| 35 | 0.10 | 0.30 | 0.00 | 6.00 | | 20 | 0.70 | 0.20 | 0.02 | 1.50 | |
| 36 | 0.10 | 0.30 | 0.00 | 6.00 | | 20 | 0.70 | 0.20 | 0.03 | 1.50 | |
| 37 | 0.10 | 0.30 | 0.00 | 6.00 | | 20 | 0.70 | 0.20 | 0.04 | 1.50 | |
| 38 | 0.10 | 0.30 | 0.00 | 6.00 | | 20 | 0.70 | 0.20 | 0.05 | 1.50 | |
| 39 | 0.10 | 0.30 | 0.00 | 6.00 | | 20 | 0.70 | 0.20 | 0.10 | 1.50 | |
| 40 | 0.10 | 0.30 | 0.00 | 6.00 | | 20 | 0.70 | 0.20 | 0.20 | 1.50 | |
| 41 | 0.10 | 0.30 | 0.00 | 6.00 | | 20 | 0.70 | 0.20 | 0.30 | 1.50 | |
| 42 | 0.10 | 0.30 | 0.10 | 6.00 | | 20 | 0.70 | 0.20 | 0.40 | 1.50 | |
| 43 | 0.10 | 0.30 | 0.00 | 6.00 | | 20 | 0.70 | 0.20 | 0.15 | 1.50 | |
| 44 | 0.10 | 0.30 | 0.00 | 6.00 | | 20 | 0.70 | 0.20 | 0.15 | 1.50 | |
| 45 | 0.10 | 0.30 | 0.00 | 6.00 | | 20 | 0.70 | 0.20 | 0.15 | 1.50 | |
| 46 | 0.10 | 0.30 | 0.00 | 6.00 | | 20 | 0.70 | 0.20 | 0.40 | 1.50 | |
| 47 | 0.10 | 0.30 | 0.00 | 6.00 | | 20 | 0.70 | 0.20 | 0.40 | 1.50 | |
| 48 | 0.10 | 0.30 | 0.00 | 6.00 | | 20 | 0.70 | 0.20 | 0.40 | 1.50 | |
| 49 | 0.10 | 0.30 | 0.00 | 6.00 | | 20 | 0.70 | 0.20 | 0.40 | 1.50 | |
| 50 | 0.10 | 0.30 | 0.00 | 6.00 | | 20 | 0.70 | 0.20 | 0.15 | 1.50 | |
| 51 | 0.10 | 0.30 | 0.00 | 6.00 | | 20 | 0.70 | 0.20 | 0.15 | 1.50 | |
| 52 | 0.10 | 0.30 | 0.00 | 6.00 | | 20 | 0.70 | 0.20 | 0.15 | 1.50 | |
| 53 | 0.10 | 0.30 | 0.00 | 6.00 | | 20 | 0.70 | 0.20 | 0.15 | 1.50 | |
| 54 | 0.10 | 0.30 | 0.00 | 6.00 | | 20 | 0.70 | 0.20 | 0.15 | 1.50 | |
| 55 | 0.10 | 0.30 | 0.00 | 6.00 | | 20 | 0.70 | 0.20 | 0.15 | 1.50 | |
| 56 | 0.10 | 0.30 | 0.00 | 6.00 | | 20 | 0.70 | 0.20 | 0.15 | 1.50 | |
| 57 | 0.10 | 0.30 | 0.00 | 6.00 | | 20 | 0.70 | 0.20 | 0.15 | 1.50 | |
| 58 | 0.10 | 0.30 | 0.00 | 6.00 | | 20 | 0.70 | 0.20 | 0.15 | 1.50 | |
| 59 | 0.10 | 0.30 | 0.00 | 6.00 | | 20 | 0.70 | 0.20 | 0.15 | 1.50 | |
| 60 | 0.10 | 0.30 | 0.00 | 6.00 | | 20 | 0.70 | 0.20 | 0.15 | 1.50 | |

| | Inner cladding material | | | | | | | Core Material of Fin | | | |
|---|---|---|---|---|---|---|---|---|---|---|---|
| No. | Si | Fe | Cu (Y) | Mn | Others | Clad Ratio (%) | Y-X (%) | Cu | Mn | Zn | Others |
| 31 | 0.70 | 0.20 | 0.80 | 1.50 | | 20 | 0.65 | — | — | 7.50 | — |
| 32 | 0.70 | 0.20 | 0.80 | 1.50 | Ti:0.20 | 20 | 0.65 | — | — | 7.50 | — |
| 33 | 0.70 | 0.20 | 0.80 | 1.50 | Cr:0.05 V:0.05 B:0.05 Zr:0.05 | 20 | 0.65 | — | — | 7.50 | — |
| 34 | 0.70 | 0.20 | 0.80 | 1.50 | | 20 | 0.80 | — | — | 7.50 | — |
| 35 | 0.70 | 0.20 | 0.80 | 1.50 | | 20 | 0.78 | — | — | 7.50 | — |
| 36 | 0.70 | 0.20 | 0.80 | 1.50 | | 20 | 0.77 | — | — | 7.50 | — |
| 37 | 0.70 | 0.20 | 0.80 | 1.50 | | 20 | 0.76 | — | — | 7.50 | — |
| 38 | 0.70 | 0.20 | 0.80 | 1.50 | | 20 | 0.75 | — | — | 7.50 | In:0.002 |
| 39 | 0.70 | 0.20 | 0.30 | 1.50 | | 20 | 0.70 | — | — | 7.50 | — |
| 40 | 0.70 | 0.20 | 0.80 | 1.50 | | 20 | 0.60 | — | — | 7.50 | — |

TABLE 1-2-continued

| 41 | 0.70 | 0.20 | 0.80 | 1.50 | 20 | 0.50 | — | — | 7.50 | — |
|---|---|---|---|---|---|---|---|---|---|---|
| 42 | 0.70 | 0.20 | 0.80 | 1.50 | 20 | 0.40 | — | — | 7.50 | — |
| 43 | 0.05 | 0.20 | 0.80 | 1.50 | 20 | 0.65 | — | — | 7.50 | — |
| 44 | 0.70 | 0.05 | 0.80 | 1.50 | 20 | 0.65 | — | — | 7.50 | — |
| 45 | 0.70 | 0.20 | 0.80 | 1.00 | 20 | 0.65 | — | — | 7.50 | — |
| 46 | 0.70 | 0.20 | 0.45 | 1.50 | 20 | 0.05 | — | — | 7.50 | — |
| 47 | 0.70 | 0.20 | 0.50 | 1.50 | 20 | 0.10 | — | — | 7.50 | — |
| 48 | 0.70 | 0.20 | 0.60 | 1.50 | 20 | 0.20 | — | — | 7.50 | — |
| 49 | 0.70 | 0.20 | 0.70 | 1.50 | 20 | 0.30 | — | — | 7.50 | — |
| 50 | 0.70 | 0.20 | 0.80 | 1.50 | 20 | 0.65 | — | — | 5.20 | — |
| 51 | 0.70 | 0.20 | 0.80 | 1.50 | 20 | 0.65 | — | — | 5.50 | — |
| 52 | 0.70 | 0.20 | 0.80 | 1.50 | 20 | 0.65 | — | — | 5.80 | — |
| 53 | 0.70 | 0.20 | 0.80 | 1.50 | 20 | 0.65 | — | — | 6.50 | — |
| 54 | 0.70 | 0.20 | 0.80 | 1.50 | 20 | 0.65 | — | — | 8.00 | — |
| 55 | 0.70 | 0.20 | 0.80 | 1.50 | 20 | 0.65 | — | — | 8.50 | — |
| 56 | 0.70 | 0.20 | 0.80 | 1.50 | 20 | 0.65 | — | — | 8.50 | In:0.02 |
| 57 | 0.70 | 0.20 | 0.80 | 1.50 | 20 | 0.65 | — | — | 8.50 | In:0.01 Sn:0.02 |
| 58 | 0.70 | 0.20 | 0.80 | 1.50 | 20 | 0.65 | — | — | 7.50 | In:0.04 Sn:0.02 |
| 59 | 0.70 | 0.20 | 0.80 | 1.50 | 20 | 0.65 | — | — | 7.50 | In:0.04 Sn:0.03 |
| 60 | 0.70 | 0.20 | 0.80 | 1.50 | 20 | 0.65 | — | — | 7.50 | -In:0.04 |

TABLE 1-3

| | Sacrificial Anode Material | | | | | | Core Material | | | | |
|---|---|---|---|---|---|---|---|---|---|---|---|
| No. | Si | Fe | Mn | Zn | Others | Clad Ratio (%) | Si | Fe | Cu (X) | Mn | Others |
| 61 | 0.10 | 0.30 | 0.00 | 6.00 | | 20 | 0.70 | 0.20 | 0.00 | 1.50 | |
| 62 | 0.10 | 0.30 | 0.00 | 6.00 | | 20 | 0.70 | 0.20 | 0.30 | 1.50 | |
| 63 | 0.10 | 0.30 | 0.00 | 6.00 | | 20 | 0.70 | 0.20 | 0.50 | 1.50 | |
| 64 | 0.10 | 0.30 | 0.00 | 6.00 | | 20 | 0.70 | 0.20 | 0.70 | 1.50 | |
| 65 | 0.10 | 0.30 | 0.00 | 6.00 | | 20 | 0.70 | 0.20 | 0.90 | 1.50 | |
| 66 | 0.10 | 0.30 | 0.00 | 6.00 | | 20 | 0.70 | 0.20 | 0.00 | 1.50 | |
| 67 | 0.10 | 0.30 | 0.00 | 6.00 | | 20 | 0.70 | 0.20 | 0.00 | 1.50 | |
| 68 | 0.10 | 0.30 | 0.00 | 6.00 | | 20 | 0.70 | 0.20 | 0.00 | 1.50 | |
| 69 | 0.10 | 0.30 | 0.00 | 6.00 | | 20 | 0.70 | 0.20 | 0.00 | 1.50 | |
| 70 | 0.10 | 0.30 | 0.00 | 6.00 | | 20 | 0.70 | 0.20 | 0.00 | 1.50 | |
| 71 | 0.10 | 0.30 | 0.00 | 6.00 | | 20 | 0.70 | 0.20 | 0.00 | 1.50 | |
| 72 | 0.10 | 0.30 | 0.00 | 6.00 | | 20 | 0.70 | 0.20 | 0.10 | 1.50 | |
| 73 | 0.10 | 0.30 | 0.00 | 6.00 | | 20 | 0.70 | 0.20 | 0.20 | 1.50 | |
| 74 | 0.10 | 0.30 | 0.00 | 6.00 | | 20 | 0.70 | 0.20 | 0.40 | 1.50 | |
| 75 | 0.10 | 0.30 | 0.00 | 6.00 | | 20 | 0.70 | 0.20 | 0.10 | 1.50 | |
| 76 | 0.10 | 0.30 | 0.00 | 6.00 | | 20 | 0.70 | 0.20 | 0.20 | 1.50 | |
| 77 | 0.10 | 0.30 | 0.00 | 6.00 | | 20 | 0.70 | 0.20 | 0.40 | 1.50 | |
| 78 | 0.10 | 0.30 | 0.00 | 6.00 | | 5 | 0.70 | 0.20 | 0.15 | 1.50 | |
| 79 | 0.10 | 0.30 | 0.00 | 6.00 | | 30 | 0.70 | 0.20 | 0.15 | 1.50 | |
| 80 | 0.10 | 0.30 | 0.00 | 6.00 | | 10 | 0.70 | 0.20 | 0.15 | 1.50 | |
| 81 | 0.10 | 0.30 | 0.00 | 6.00 | | 20 | 0.70 | 0.20 | 0.15 | 1.50 | |
| 82 | 0.10 | 0.30 | 0.00 | 6.00 | | 20 | 0.70 | 0.20 | 0.15 | 1.50 | |
| 83 | 0.10 | 0.30 | 0.00 | 6.00 | | 20 | 0.70 | 0.20 | 0.15 | 1.50 | |
| 84 | 0.10 | 0.30 | 0.00 | 2.00 | | 20 | 0.70 | 0.20 | 0.00 | 1.50 | |
| 85 | 0.10 | 0.30 | 0.00 | 2.00 | | 20 | 0.70 | 0.20 | 0.00 | 1.50 | |
| 86 | 0.10 | 0.30 | 0.00 | 3.00 | | 20 | 0.70 | 0.20 | 0.00 | 1.50 | |

| | Inner cladding material | | | | | | | Core Material of Fin | | | |
|---|---|---|---|---|---|---|---|---|---|---|---|
| No. | Si | Fe | Cu (Y) | Mn | Others | Clad Ratio (%) | Y-X (%) | Cu | Mn | Zn | Others |
| 61 | — | — | — | — | — | — | — | — | — | 7.50 | — |
| 62 | — | — | — | — | — | — | — | — | — | 7.50 | — |
| 63 | — | — | — | — | — | — | — | — | — | 5.50 | — |
| 64 | — | — | — | — | — | — | — | — | — | 5.00 | — |
| 65 | — | — | — | — | — | — | — | — | — | 5.00 | — |
| 66 | 0.70 | 0.20 | 0.20 | 1.50 | | 20 | 0.20 | — | — | 7.50 | — |
| 67 | 0.70 | 0.20 | 0.30 | 1.50 | | 20 | 0.30 | — | — | 7.50 | — |
| 68 | 0.70 | 0.20 | 0.50 | 1.50 | | 20 | 0.50 | — | — | 7.50 | — |
| 69 | 0.70 | 0.20 | 0.80 | 1.50 | | 20 | 0.80 | — | — | 7.50 | — |
| 70 | 0.70 | 0.20 | 1.00 | 1.50 | | 20 | 1.00 | — | — | 7.50 | — |
| 71 | 0.70 | 0.20 | 1.20 | 1.50 | | 20 | 1.20 | — | — | 7.50 | — |
| 72 | 0.70 | 0.20 | 0.20 | 1.50 | | 20 | 0.10 | — | — | 7.50 | — |
| 73 | 0.70 | 0.20 | 0.30 | 1.50 | | 20 | 0.10 | — | — | 7.50 | — |

TABLE 1-3-continued

| No. | Si | Fe | Cu (Y) | Mn | Others | Clad Ratio (%) | Y-X (%) | Cu | Mn | Zn | Others |
|---|---|---|---|---|---|---|---|---|---|---|---|
| 74 | 0.70 | 0.20 | 0.50 | 1.50 |  | 20 | 0.10 | — | — | 6.50 | — |
| 75 | 0.70 | 0.20 | 1.50 | 1.50 |  | 20 | 1.40 | — | — | 7.50 | — |
| 76 | 0.70 | 0.20 | 1.50 | 1.50 |  | 20 | 1.30 | — | — | 7.50 | — |
| 77 | 0.70 | 0.20 | 1.50 | 1.50 |  | 20 | 1.10 | — | — | 7.50 | — |
| 78 | 0.70 | 0.20 | 0.80 | 1.50 |  | 20 | 0.65 | — | 1.00 | 6.00 | — |
| 79 | 0.70 | 0.20 | 0.80 | 1.50 |  | 20 | 0.65 | — | — | 7.50 | — |
| 80 | 0.70 | 0.20 | 0.80 | 1.50 |  | 20 | 0.65 | — | — | 7.50 | — |
| 81 | 0.70 | 0.20 | 0.80 | 1.50 |  | 5 | 0.65 | — | — | 7.50 | — |
| 82 | 0.70 | 0.20 | 0.80 | 1.50 |  | 30 | 0.65 | — | — | 7.50 | — |
| 83 | 0.70 | 0.20 | 0.80 | 1.50 |  | 10 | 0.65 | — | — | 7.50 | — |
| 84 | 0.70 | 0.20 | 0.80 | 1.50 |  | 20 | 0.80 | — | — | 5.00 | — |
| 85 | 0.70 | 0.20 | 0.80 | 1.50 |  | 20 | 0.80 | — | — | 5.00 | — |
| 86 | 0.70 | 0.20 | 0.80 | 1.50 |  | 20 | 0.80 | — | — | 5.00 | — |

TABLE 1-4

| | Sacrificial Anode Material | | | | | | Core Material | | | | |
|---|---|---|---|---|---|---|---|---|---|---|---|
| No. | Si | Fe | Mn | Zn | Others | Clad Ratio (%) | Si | Fe | Cu (X) | Mn | Others |
| 87 | 0.10 | 0.30 | 0.00 | 3.20 |  | 20 | 0.70 | 0.20 | 0.00 | 1.50 |  |
| 88 | 0.10 | 0.30 | 0.00 | 3.60 |  | 20 | 0.70 | 0.20 | 0.00 | 1.50 |  |
| 89 | 0.10 | 0.30 | 0.00 | 3.90 |  | 20 | 0.70 | 0.20 | 0.00 | 1.50 |  |
| 90 | 0.10 | 0.30 | 0.00 | 4.00 |  | 20 | 0.70 | 0.20 | 0.00 | 1.50 |  |
| 91 | 0.10 | 0.30 | 0.00 | 4.20 |  | 20 | 0.70 | 0.20 | 0.00 | 1.50 |  |
| 92 | 0.10 | 0.30 | 0.00 | 4.80 |  | 20 | 0.70 | 0.20 | 0.00 | 1.50 |  |
| 93 | 0.10 | 0.30 | 0.00 | 5.20 |  | 20 | 0.70 | 0.20 | 0.00 | 1.50 |  |
| 94 | 0.10 | 0.30 | 0.00 | 5.50 |  | 20 | 0.70 | 0.20 | 0.00 | 1.50 |  |
| 95 | 0.10 | 0.30 | 0.00 | 5.80 |  | 20 | 0.70 | 0.20 | 0.40 | 1.50 |  |
| 96 | 0.10 | 0.30 | 0.00 | 6.30 |  | 20 | 0.70 | 0.20 | 0.00 | 1.50 |  |
| 97 | 0.10 | 0.30 | 0.00 | 6.50 |  | 20 | 0.70 | 0.20 | 0.40 | 1.50 |  |
| 98 | 0.10 | 0.30 | 0.00 | 6.80 |  | 20 | 0.70 | 0.20 | 0.00 | 1.50 |  |
| 99 | 0.10 | 0.30 | 0.00 | 7.00 |  | 20 | 0.70 | 0.20 | 0.40 | 1.50 |  |
| 100 | 0.20 | 0.10 | 0.00 | 7.20 |  | 20 | 0.70 | 0.20 | 0.00 | 1.50 |  |
| 101 | 0.20 | 0.10 | 0.00 | 7.50 |  | 20 | 0.70 | 0.20 | 0.00 | 1.50 |  |
| 102 | 0.20 | 0.10 | 0.00 | 7.70 |  | 20 | 0.70 | 0.20 | 0.40 | 1.50 |  |
| 103 | 0.10 | 0.20 | 0.00 | 8.00 |  | 20 | 0.70 | 0.20 | 0.00 | 1.50 |  |
| 104 | 0.10 | 0.20 | 0.00 | 8.20 |  | 20 | 0.70 | 0.20 | 0.40 | 1.50 |  |
| 105 | 0.10 | 0.20 | 0.00 | 8.50 |  | 20 | 0.70 | 0.20 | 0.00 | 1.50 |  |
| 106 | 0.20 | 0.10 | 0.00 | 8.80 |  | 20 | 0.70 | 0.20 | 0.40 | 1.50 |  |
| 107 | 0.30 | 0.10 | 0.00 | 9.00 |  | 20 | 0.70 | 0.20 | 0.00 | 1.50 |  |
| 108 | 0.30 | 0.10 | 0.00 | 9.50 |  | 20 | 0.70 | 0.20 | 0.40 | 1.50 |  |
| 109 | 0.10 | 0.10 | 0.00 | 9.90 |  | 20 | 0.70 | 0.20 | 0.00 | 1.50 |  |

| | Inner cladding material | | | | | | | Core Material of Fin | | | |
|---|---|---|---|---|---|---|---|---|---|---|---|
| No. | Si | Fe | Cu (Y) | Mn | Others | Clad Ratio (%) | Y-X (%) | Cu | Mn | Zn | Others |
| 87 | 0.70 | 0.20 | 0.80 | 1.50 |  | 20 | 0.80 | — | — | 5.00 | — |
| 88 | 0.70 | 0.20 | 0.80 | 1.50 |  | 20 | 0.80 | — | — | 5.00 | — |
| 89 | 0.70 | 0.20 | 0.80 | 1.50 |  | 20 | 0.80 | — | — | 5.00 | — |
| 90 | 0.30 | 0.20 | 0.80 | 1.50 |  | 20 | 0.80 | — | — | 5.00 | — |
| 91 | 0.70 | 0.20 | 0.80 | 1.50 |  | 20 | 0.80 | — | — | 3.00 | — |
| 92 | 0.70 | 0.20 | 0.50 | 1.50 |  | 20 | 0.80 | — | — | 5.00 | — |
| 93 | 0.70 | 0.20 | 0.80 | 1.50 |  | 20 | 0.80 | — | — | 5.00 | — |
| 94 | 0.70 | 0.20 | 0.80 | 1.50 |  | 20 | 0.80 | — | — | 5.00 | — |
| 95 | — | — | — | — | — | — | — | — | — | 8.50 | — |
| 96 | 0.70 | 0.20 | 0.80 | 1.50 |  | 20 | 0.80 | — | — | 8.50 | — |
| 97 | — | — | — | — | — | — | — | — | — | 8.50 | — |
| 98 | 0.70 | 0.20 | 0.80 | 1.50 |  | 20 | 0.80 | — | — | 8.50 | — |
| 99 | — | — | — | — | — | — | — | — | — | 8.50 | — |
| 100 | 0.70 | 0.20 | 0.80 | 1.50 |  | 20 | 0.80 | — | — | 8.50 | — |
| 101 | 0.70 | 0.20 | 0.80 | 1.50 |  | 20 | 0.80 | — | — | 8.50 | — |
| 102 | — | — | — | — | — | — | — | — | — | 8.50 | — |
| 103 | 0.70 | 0.20 | 0.80 | 1.50 |  | 20 | 0.80 | — | — | 8.50 | — |
| 104 | — | — | — | — | — | — | — | — | — | 8.50 | — |
| 105 | 0.70 | 0.20 | 0.80 | 1.50 |  | 20 | 0.80 | — | — | 8.50 | — |
| 106 | — | — | — | — | — | — | — | — | — | 8.50 | — |
| 107 | 0.70 | 0.20 | 0.80 | 1.50 |  | 20 | 0.80 | — | — | 8.50 | — |
| 108 | — | — | — | — | — | — | — | — | — | 8.50 | — |
| 109 | 0.70 | 0.20 | 0.80 | 1.50 |  | 20 | 0.80 | — | — | 8.50 | — |

TABLE 2

| | Sacrificial Anode Material | | | | | Core Material | | | | |
|---|---|---|---|---|---|---|---|---|---|---|
| No. | Si | Fe | Mn | Zn | Others | Clad Ratio (%) | Si | Fe | Cu (X) | Mn | Others |
| 201 | 0.10 | 0.30 | 0.00 | 2.00 | — | 20 | 0.70 | 0.20 | 0.15 | 1.50 | — |
| 202 | 0.10 | 0.30 | 0.00 | 11.00 | — | 20 | 0.70 | 0.20 | 0.15 | 1.50 | — |
| 203 | 1.70 | 0.30 | 0.00 | 6.00 | — | 20 | 0.70 | 0.20 | 0.15 | 1.50 | — |
| 204 | 0.10 | 1.70 | 0.00 | 6.00 | — | 20 | 0.70 | 0.20 | 0.15 | 1.50 | — |
| 205 | 0.10 | 0.30 | 1.70 | 6.00 | — | 20 | 0.70 | 0.20 | 0.15 | 1.50 | — |
| 206 | 0.10 | 0.30 | 0.00 | 6.00 | — | 20 | 0.70 | 0.20 | 1.50 | 1.50 | — |
| 207 | 0.10 | 0.30 | 0.00 | 6.00 | — | 20 | 0.70 | 0.20 | 0.15 | 0.30 | — |
| 208 | 0.10 | 0.30 | 0.00 | 6.00 | — | 20 | 0.70 | 0.20 | 0.15 | 2.20 | — |
| 209 | 0.10 | 0.30 | 0.00 | 6.00 | — | 20 | 1.70 | 0.20 | 0.15 | 1.50 | — |
| 210 | 0.10 | 0.30 | 0.00 | 6.00 | — | 20 | 0.70 | 1.00 | 0.15 | 1.50 | — |
| 211 | 0.10 | 0.30 | 0.00 | 6.00 | — | 20 | 0.70 | 0.20 | 0.40 | 1.50 | — |
| 212 | 0.10 | 0.30 | 0.00 | 6.00 | — | 20 | 0.70 | 0.20 | 0.15 | 1.50 | — |
| 213 | 0.10 | 0.30 | 0.00 | 6.00 | — | 20 | 0.70 | 0.20 | 0.15 | 1.50 | — |
| 214 | 0.10 | 0.30 | 0.00 | 6.00 | — | 20 | 0.70 | 0.20 | 0.15 | 1.50 | — |
| 215 | 0.10 | 0.30 | 0.00 | 6.00 | — | 20 | 0.70 | 0.20 | 0.15 | 1.50 | — |
| 216 | 0.10 | 0.30 | 0.00 | 6.00 | — | 3 | 0.70 | 0.20 | 0.15 | 1.50 | — |
| 217 | 0.10 | 0.30 | 0.00 | 6.00 | — | 5 | 0.70 | 0.20 | 0.15 | 1.50 | — |
| 218 | 0.10 | 0.30 | 0.00 | 2.00 | — | 10 | 0.70 | 0.20 | 0.15 | 1.50 | — |
| 219 | 0.10 | 0.30 | 0.00 | 2.40 | — | 10 | 0.70 | 0.20 | 0.15 | 1.50 | — |
| 220 | 0.10 | 0.30 | 0.00 | 4.00 | — | 10 | 0.70 | 0.20 | 0.15 | 1.50 | — |

| | Inner cladding material | | | | | | | Core Material of Fin | | | |
|---|---|---|---|---|---|---|---|---|---|---|---|
| No. | Si | Fe | Cu (Y) | Mn | Others | Clad Ratio (%) | Y-X (%) | Cu | Mn | Zn | Others |
| 201 | — | — | — | — | — | — | — | — | 1.00 | 3.00 | — |
| 202 | — | — | — | — | — | — | — | — | — | 5.00 | — |
| 203 | — | — | — | — | — | — | — | — | — | 6.00 | — |
| 204 | — | — | — | — | — | — | — | — | — | 6.50 | — |
| 205 | — | — | — | — | — | — | — | — | — | 3.50 | — |
| 206 | — | — | — | — | — | — | — | — | — | — | — |
| 207 | — | — | — | — | — | — | — | — | — | 7.50 | — |
| 208 | — | — | — | — | — | — | — | — | — | — | — |
| 209 | — | — | — | — | — | — | — | — | — | — | — |
| 210 | — | — | — | — | — | — | — | — | — | 7.50 | — |
| 211 | 0.70 | 0.20 | 0.00 | 1.50 | — | 20 | -0.40 | — | — | 7.50 | — |
| 212 | 0.70 | 0.20 | 1.50 | 1.50 | — | 20 | 1.35 | — | — | — | — |
| 213 | 0.70 | 0.20 | 0.80 | 2.20 | — | 20 | 0.65 | — | — | — | — |
| 214 | 1.70 | 0.20 | 0.80 | 1.50 | — | 20 | 0.65 | — | — | — | — |
| 215 | 0.70 | 1.00 | 0.80 | 1.50 | — | 20 | 0.65 | — | — | 7.50 | — |
| 216 | — | — | — | — | — | — | — | 0.15 | 1.20 | 5.00 | — |
| 217 | — | — | — | — | — | 20 | — | — | — | — | — |
| 218 | — | — | — | — | — | 20 | — | — | — | — | — |
| 219 | 0.70 | 0.20 | 0.80 | 1.50 | — | 20 | — | — | — | — | — |
| 220 | 0.70 | 0.20 | 0.80 | 1.50 | — | 20 | — | 0.12 | 1.20 | 2.00 | — |

TABLE 3-1

| | Tube Material | | | | Aluminum Fin | | Alumimim Fin | | | |
|---|---|---|---|---|---|---|---|---|---|---|
| No. | Sacrificial Anode Material Surface Pitting Potential (mV vs Ag/AgCl) | Core Material Pitting Potential | Inner cladding material Pitting Potential | Fin Material Fin Pitting Potential Ag/AgCl | Pitting Potential-Sacrificial Anode Material Surface Pitting Potential (mV) | Tensile Strength (MPa) | Sacrificial Anode Material Surface Pitting Potential | Pitting Potential-Sacrificial Anode Material Surface Pitting Potential | State after 2,500 h in Corrosion Test | Success in Manufacturing of Test Sample |
| 1 | -820 | -670 | — | -900 | -80 | O | O | O | O | O |
| 2 | -960 | -670 | — | -1,000 | -40 | O | O | O | OO | O |
| 3 | -920 | -670 | — | -960 | -40 | O | O | O | OO | O |
| 4 | -930 | -670 | — | -970 | -40 | O | O | O | OO | O |
| 5 | -850 | -670 | — | -890 | -40 | O | O | O | OO | O |
| 6 | -940 | -670 | — | -980 | -40 | O | O | O | OO | O |
| 7 | -950 | -670 | — | -990 | -40 | O | O | O | OO | O |
| 8 | -980 | -670 | — | 1,020 | -40 | O | O | O | OO | O |
| 9 | -930 | -670 | — | -970 | -40 | O | O | O | OO | O |
| 10 | -940 | -670 | — | -980 | -40 | O | O | O | OO | O |
| 11 | -880 | -670 | — | -920 | -40 | O | O | O | OO | O |
| 12 | -940 | -670 | — | -980 | -40 | O | O | O | OO | O |

TABLE 3-1-continued

| No. | Tube Material Sacrificial Anode Material Surface Pitting Potential (mV vs Ag/AgCl) | Core Material Pitting Potential | Inner cladding material Pitting Potential | Aluminum Fin Fin Material Fin Pitting Potential Ag/AgCl) | Pitting Potential-Sacrificial Anode Material Surface Pitting Potential (mV) | Tensile Strength (MPa) | Aluminum Fin Sacrificial Anode Material Surface Pitting Potential | Pitting Potential-Sacrificial Anode Material Surface Pitting Potential | State after 2,500 h in Corrosion Test | Success in Manufacturing of Test Sample |
|---|---|---|---|---|---|---|---|---|---|---|
| 13 | −850 | −670 | — | −890 | −40 | O | O | O | O | O |
| 14 | −880 | −670 | — | −920 | −40 | O | O | O | OO | O |
| 15 | −940 | −680 | — | −980 | −40 | O | O | O | OO | O |
| 16 | −920 | −630 | — | −960 | −40 | O | O | O | OO | O |
| 17 | −940 | −690 | — | −980 | −40 | O | O | O | OO | O |
| 18 | −940 | −660 | — | −980 | −40 | O | O | O | OO | O |
| 19 | −940 | −660 | — | −980 | −40 | O | O | O | OO | O |
| 20 | −940 | −660 | — | −980 | −40 | O | O | O | OO | O |
| 21 | −940 | −660 | — | −980 | −40 | O | O | O | OO | O |
| 22 | −940 | −660 | — | −980 | −40 | O | O | O | OO | O |
| 23 | −940 | −660 | — | −980 | −40 | O | O | O | OO | O |
| 24 | −940 | −660 | — | −980 | −40 | O | O | O | OO | O |
| 25 | −940 | −670 | — | −980 | −40 | O | O | O | OO | O |
| 26 | −940 | −660 | −660 | −980 | −40 | O | O | O | OO | O |
| 27 | −940 | −650 | −620 | −980 | −40 | O | O | O | OO | O |
| 28 | −940 | −660 | −640 | −980 | −40 | O | O | O | OO | O |
| 29 | −940 | −660 | −630 | −980 | −40 | O | O | O | OO | O |
| 30 | −940 | −660 | −630 | −980 | −40 | O | O | O | OO | O |

TABLE 3-2

| No. | Tube Material Sacrificial Anode Material Surface Pitting Potential (mV vs Ag/AgCl) | Core Material Pitting Potential | Inner cladding material Pitting Potential | Aluminum Fin Fin Material Fin Pitting Potential (mV vs Ag/AgCl) | Pitting Potential-Sacrificial Anode Material Surface Pitting Potential (mV) | Tensile Strength (MPa) | Aluminum Fin Sacrificial Anode Material Surface Pitting Potential | Pitting Potential-Sacrificial Anode Material Surface Pitting Potential | State after 2,500 h in Corrosion Test | Success in Manufacturing of Test Sample |
|---|---|---|---|---|---|---|---|---|---|---|
| 31 | −940 | −660 | −630 | −980 | −40 | O | O | O | OO | O |
| 32 | −940 | −660 | −630 | −980 | −40 | O | O | O | OO | O |
| 33 | −940 | −660 | −630 | −980 | −40 | O | O | O | OO | O |
| 34 | −940 | −660 | −630 | −980 | −40 | O | O | O | OO | O |
| 35 | −940 | −660 | −630 | −980 | −40 | O | O | O | OO | O |
| 36 | −940 | −660 | −630 | −980 | −40 | O | O | O | OO | O |
| 37 | −940 | −660 | −630 | −980 | −40 | O | O | O | OO | O |
| 38 | −940 | −660 | −630 | −980 | −40 | O | O | O | OO | O |
| 39 | −940 | −660 | −630 | −980 | −40 | O | O | O | OO | O |
| 40 | −940 | −660 | −630 | −980 | −40 | O | O | O | OO | O |
| 41 | −940 | −650 | −630 | −980 | −40 | O | O | O | OO | O |
| 42 | −940 | −645 | −630 | −980 | −40 | O | O | O | OO | O |
| 43 | −940 | −660 | −630 | −980 | −40 | O | O | O | OO | O |
| 44 | −940 | −660 | −630 | −980 | −40 | O | O | O | OO | O |
| 45 | −940 | −660 | −630 | −980 | −40 | O | O | O | OO | O |
| 46 | −940 | −645 | −640 | −980 | −40 | O | O | O | OO | O |
| 47 | −940 | −645 | −640 | −980 | −40 | O | O | O | OO | O |
| 48 | −940 | −645 | −635 | −980 | −40 | O | O | O | OO | O |
| 49 | −940 | −645 | −635 | −980 | −40 | O | O | O | OO | O |
| 50 | −940 | −660 | −630 | −945 | −5 | O | O | O | OO | O |
| 51 | −940 | −660 | −630 | −950 | −10 | O | O | O | OO | O |
| 52 | −940 | −660 | −630 | −955 | −15 | O | O | O | OO | O |
| 53 | −940 | −660 | −630 | −970 | −30 | O | O | O | OO | O |
| 54 | −940 | −660 | −630 | −990 | −50 | O | O | O | OO | O |
| 55 | −940 | −660 | −630 | −1,000 | −60 | O | O | O | OO | O |
| 56 | −940 | −660 | −630 | −1,020 | −80 | O | O | O | OO | O |
| 57 | −940 | −660 | −630 | −1,030 | −90 | O | O | O | OO | O |
| 58 | −940 | −660 | −630 | −1,040 | −100 | O | O | O | OO | O |
| 59 | −940 | −660 | −630 | −1,050 | −110 | O | O | O | OO | O |
| 60 | −940 | −660 | −630 | −1,060 | −120 | O | O | O | OO | O |

TABLE 3-3

| | Tube Material | | | Aluminum Fin | | | Aluminum Fin | | | |
|---|---|---|---|---|---|---|---|---|---|---|
| No. | Sacrificial Anode Material Surface Pitting Potential (mV vs Ag/AgCl) | Core Material Pitting Potential | Inner cladding material Pitting Potential | Fin Material Fin Pitting Potential (mV vs Ag/AgCl) | Pitting Potential- Sacrificial Anode Material Surface Pitting Potential (mV) | Tensile Strength (MPa) | Sacrificial Anode Material Surface Pitting Potential | Pitting Potential- Sacrificial Anode Material Surface Pitting Potential | State after 2,500 h in Corrosion Test | Success in Manufacturing of Test Sample |
| 61 | −940 | −680 | — | −980 | −40 | O | O | O | OO | O |
| 62 | −940 | −650 | — | −980 | −40 | O | O | O | OO | O |
| 63 | −930 | −645 | — | −950 | −20 | O | O | O | OO | O |
| 64 | −920 | −635 | — | −940 | −20 | O | O | O | OO | O |
| 65 | −920 | −630 | — | −940 | −20 | O | O | O | OO | O |
| 66 | −940 | −680 | −660 | −980 | −40 | O | O | O | OO | O |
| 67 | −940 | −680 | −650 | −980 | −40 | O | O | O | OO | O |
| 68 | −940 | −670 | −645 | −980 | −40 | O | O | O | OO | O |
| 69 | −940 | −660 | −630 | −980 | −40 | O | O | O | OO | O |
| 70 | −940 | −650 | −625 | −980 | −40 | O | O | O | OO | O |
| 71 | −940 | −650 | −625 | −980 | −40 | O | O | O | OO | O |
| 72 | −940 | −660 | −660 | −980 | −40 | O | O | O | OO | O |
| 73 | −940 | −660 | −650 | −980 | −40 | O | O | O | OO | O |
| 74 | −930 | −645 | −645 | −970 | −40 | O | O | O | OO | O |
| 75 | −940 | −650 | −620 | −980 | −40 | O | O | O | OO | O |
| 76 | −940 | −650 | −620 | −980 | −40 | O | O | O | OO | O |
| 77 | −930 | −635 | −620 | −980 | −50 | O | O | O | OO | O |
| 78 | −850 | −660 | −630 | −900 | −50 | O | O | O | OO | O |
| 79 | −950 | −660 | −630 | −1,000 | −50 | O | O | O | OO | O |
| 80 | −890 | −660 | −630 | −980 | −90 | O | O | O | OO | O |
| 81 | −940 | −660 | −640 | −980 | −40 | O | O | O | OO | O |
| 82 | −940 | −660 | −630 | −980 | −40 | O | O | O | OO | O |
| 83 | −940 | −660 | −635 | −980 | −40 | O | O | O | OO | O |
| 84 | −830 | −660 | −630 | −940 | −110 | O | O | O | OO | O |
| 85 | −830 | −660 | −630 | −940 | −110 | O | O | O | OO | O |
| 86 | −840 | −660 | −630 | −940 | −100 | O | O | O | OO | O |

TABLE 3-4

| | Tube Material | | | Aluminum Fin | | | Aluminum Fin | | | |
|---|---|---|---|---|---|---|---|---|---|---|
| No. | Sacrificial Anode Material Surface Pitting Potential (mV vs Ag/AgCl) | Core Material Pitting Potential | Inner cladding material Pitting Potential | Fin Material Fin Pitting Potential (mV vs Ag/AgCl) | Pitting Potential- Sacrificial Anode Material Surface Pitting Potential (mV) | Tensile Strength (MPa) | Sacrificial Anode Material Surface Pitting Potential | Pitting Potential- Sacrificial Anode Material Surface Pitting Potential | State after 2,500 h in Corrosion Test | Success in Manufacturing of Test Sample |
| 87 | −840 | −660 | −630 | −940 | −100 | O | O | O | O | O |
| 88 | −850 | −660 | −630 | −940 | −90 | O | O | O | O | O |
| 89 | −860 | −660 | −630 | −940 | −80 | O | O | O | O | O |
| 90 | −870 | −660 | −630 | −940 | −70 | O | O | O | O | O |
| 91 | −870 | −660 | −630 | −940 | −70 | O | O | O | O | O |
| 92 | −890 | −660 | −630 | −940 | −50 | O | O | O | OO | O |
| 93 | −900 | −660 | −630 | −940 | −40 | O | O | O | OO | O |
| 94 | −920 | −660 | −630 | −940 | −20 | O | O | O | OO | O |
| 95 | −940 | −645 | — | −1,000 | −60 | O | O | O | OO | O |
| 96 | −940 | −660 | −630 | −1,000 | −60 | O | O | O | OO | O |
| 97 | −940 | −645 | — | −1,000 | −60 | O | O | O | OO | O |
| 98 | −950 | −660 | −630 | −1,000 | −50 | O | O | O | OO | O |
| 99 | −950 | −645 | — | −1,000 | −50 | O | O | O | OO | O |
| 100 | −950 | −660 | −630 | −1,000 | −50 | O | O | O | OO | O |
| 101 | −950 | −660 | −630 | −1,000 | −50 | O | O | O | OO | O |
| 102 | −950 | −645 | — | −1,000 | −50 | O | O | O | OO | O |
| 103 | −960 | −660 | −630 | −1,000 | −40 | O | O | O | OO | O |
| 104 | −960 | −645 | — | −1,000 | −40 | O | O | O | OO | O |
| 103 | −960 | −660 | −630 | −1,000 | −40 | O | O | O | OO | O |
| 106 | −960 | −645 | — | −1,000 | −40 | O | O | O | OO | O |
| 107 | −960 | −660 | −630 | −1,000 | −40 | O | O | O | OO | O |
| 108 | −960 | − | — | −1,000 | −40 | O | O | O | OO | O |
| 109 | −960 | −660 | −630 | −1,000 | −40 | O | O | O | OO | O |

TABLE 4

| No. | Tube Material Sacrificial Anode Material Surface Pitting Potential (mV vs Ag/AgCl) | Tube Material Core Material Pitting Potential | Tube Material Inner cladding material Pitting Potential | Aluminum Fin Fin Material Fin Pitting Potential (mV vs Ag/AgCl) | Aluminum Fin Pitting Potential-Sacrificial Anode Material Surface Pitting Potential (mV) | Tensile Strength (MPa) | Aluminum Fin Sacrificial Anode Material Surface Pitting Potential | Aluminum Fin Pitting Potential-Sacrificial Anode Material Surface Pitting Potential | State after 2,500 h in Corrosion Test | Success in Manufacturing of Test Sample |
|---|---|---|---|---|---|---|---|---|---|---|
| 201 | −770 | −660 | — | −810 | −40 | O | × | O | × | O |
| 202 | −960 | −660 | — | −940 | 20 | O | O | × | × | O |
| 203 | −920 | −660 | — | −960 | −40 | O | O | O | × | O |
| 204 | −930 | −660 | — | −970 | −40 | O | O | O | × | O |
| 205 | −840 | −660 | — | −880 | −40 | O | O | O | × | O |
| 206 | — | — | — | — | — | — | — | — | — | × |
| 207 | −940 | −710 | — | −980 | −40 | × | O | O | O | O |
| 208 | — | — | — | — | — | — | — | — | — | × |
| 209 | — | — | — | — | — | — | — | — | — | × |
| 210 | −940 | −660 | — | −980 | −40 | O | O | O | × | O |
| 211 | −940 | −645 | −660 | −980 | −40 | O | O | O | × | O |
| 212 | — | — | — | — | — | — | — | — | — | × |
| 213 | — | — | — | — | — | — | — | — | — | × |
| 214 | — | — | — | — | — | — | — | — | — | × |
| 215 | −940 | −660 | −630 | −980 | −40 | O | O | O | × | O |
| 216 | −790 | −660 | −630 | −830 | −40 | O | × | O | × | O |
| 217 | −850 | −660 | −630 | −700 | 150 | O | O | × | × | O |
| 218 | −750 | −660 | −630 | −700 | 50 | O | × | × | × | O |
| 219 | −780 | −660 | −630 | −700 | 80 | O | × | × | × | O |
| 220 | −820 | −660 | −630 | −750 | 70 | O | O | × | × | O |

The invention claimed is:

1. An aluminum alloy heat exchanger with an atmosphere side used in a dilute chloride ion environment of 1,000 ppm or less, the aluminum alloy heat exchanger being formed by brazing a tube and an aluminum fin, the tube being formed of a tube aluminum alloy clad two-layer material consisting of two layers formed of a core material formed of an aluminum alloy and a sacrificial anode material cladded onto one side surface of the core material such that the core material serves as a coolant passage side and the sacrificial anode material serves as the atmosphere side, wherein the core material is formed of an aluminum alloy comprising Mn of 0.60 to 2.00 mass % and Cu of 1.00 mass % or less, and optionally one or two or more of Si of 1.50 mass % or less, Fe of 0.70 mass % or less, and Ti of 0.01 to 0.30 mass %, with the balance being Al and inevitable impurities, the sacrificial anode material is formed of an aluminum alloy comprising Zn of 2.50 to 10.00 mass %, and optionally one or two or more of Si of 1.50 mass % or less, Fe of 1.50 mass % or less, and Mn of 1.50 mass % or less, with the balance being Al and inevitable impurities, pitting potential of a sacrificial anode material surface of the tube of the aluminum alloy heat exchanger in a 5% NaCl solution is −800 (mV vs Ag/AgCl) or less, and pitting potential of the aluminum fin of the aluminum alloy heat exchanger in a 5% NaCl solution is less than the pitting potential of the sacrificial anode material surface of the tube of the aluminum alloy heat exchanger in a 5% NaCl solution.

2. An aluminum alloy heat exchanger with an atmosphere side used in a dilute chloride ion environment of 1,000 ppm or less, the aluminum alloy heat exchanger being formed by brazing a tube and an aluminum fin, the tube being formed of a tube aluminum alloy clad three-layer material formed of a core material formed of an aluminum alloy, a sacrificial anode material cladded onto one side surface of the core material, and an inner cladding material cladded onto the other side surface of the core material such that the inner cladding material serves as a coolant passage side and the sacrificial anode material serves as the atmosphere side, wherein the core material is formed of an aluminum alloy comprising Mn of 0.60 to 2.00 mass % and Cu of 0.60 mass % or less, and optionally one or two or more of Si of 1.50 mass % or less, Fe of 0.70 mass % or less, and Ti of 0.01 to 0.30 mass %, with the balance being Al and inevitable impurities, the sacrificial anode material is formed of an aluminum alloy comprising Zn of 2.50 to 10.00 mass %, and optionally one or two or more of Si of 1.50 mass % or less, Fe of 1.50 mass % or less, and Mn of 1.50 mass % or less, with the balance being Al and inevitable impurities, the inner cladding material is formed of an aluminum alloy comprising Mn of 0.60 to 2.00 mass % and Cu of 0.20 to 1.50 mass %, and optionally one or two or more of Si of 1.50 mass % or less, Fe of 0.70 mass % or less, and Ti of 0.01 to 0.30 mass %, with the balance being Al and inevitable impurities, a difference (Y−X) between a Cu content (Y) of the inner cladding material of the tube aluminum alloy clad three-layer material and a Cu content (X) of the core material of the tube aluminum alloy clad three-layer material exceeds 0.00 mass %, pitting potential of a sacrificial anode material surface of the tube of the aluminum alloy heat exchanger in a 5% NaCl solution is-800 (mV vs Ag/AgCl) or less, and pitting potential of the aluminum fin of the aluminum alloy heat exchanger in a 5% NaCl solution is less than the pitting potential of the sacrificial anode material surface of the tube of the aluminum alloy heat exchanger in a 5% NaCl solution.

* * * * *